(12) United States Patent
Lu et al.

(10) Patent No.: US 10,657,556 B1
(45) Date of Patent: May 19, 2020

(54) CLICK-THROUGH PREDICTION FOR TARGETED CONTENT

(71) Applicant: Twitter, Inc., San Francisco, CA (US)

(72) Inventors: Yue Lu, Redwood City, CA (US); Parag Agrawal, San Francisco, CA (US); Cheng Li, Ann Arbor, MI (US); Sandeep Pandey, San Francisco, CA (US); Michael Jahr, San Francisco, CA (US); Jeremy Ginsberg, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 308 days.

(21) Appl. No.: 15/178,381

(22) Filed: Jun. 9, 2016

Related U.S. Application Data

(60) Provisional application No. 62/173,249, filed on Jun. 9, 2015.

(51) Int. Cl.
*G06Q 30/02* (2012.01)
*G06N 20/00* (2019.01)

(52) U.S. Cl.
CPC ......... *G06Q 30/0243* (2013.01); *G06N 20/00* (2019.01)

(58) Field of Classification Search
CPC .................................................. G06Q 30/0243
See application file for complete search history.

(56) References Cited

U.S. PATENT DOCUMENTS

| | | | | |
|---|---|---|---|---|
| 2011/0099131 A1* | 4/2011 | Sellamanickam | ..... | G06N 20/00 706/12 |
| 2012/0023043 A1* | 1/2012 | Cetin | ..... | G06N 7/005 706/12 |
| 2012/0143672 A1* | 6/2012 | You | ..... | G06Q 30/0243 705/14.42 |
| 2012/0259919 A1* | 10/2012 | Yan | ..... | G06O 30/02 709/204 |
| 2014/0282117 A1* | 9/2014 | Anderson | ..... | G06F 16/24 715/760 |

(Continued)

OTHER PUBLICATIONS

"Click-through Prediction for Advertising in Twitter Timeline", by Li et al. KDD'15, Aug. 10-13, 2015, Sydney, NSW, Australia. (Year: 2015).*

(Continued)

*Primary Examiner* — William A Brandenburg
(74) *Attorney, Agent, or Firm* — Smith Baluch LLP

(57) ABSTRACT

In some examples, a computing device includes at least one processor and at least one module, operable by the at least one processor to receive, from a client device of a user, a request for one or more advertisements to display at the client device with a set of messages. The set of messages is associated with the user in a social network messaging service. The at least one module may be further operable to determine a probability that the user will select a candidate advertisement using a machine learning model based on point-wise learning and pair-wise learning. The at least one module may be further operable to determine, based on the probability that the user will select the candidate advertisement, a candidate score for the candidate advertisement, determine that the candidate score satisfies a threshold, and send, for display at the client device, the candidate advertisement.

15 Claims, 4 Drawing Sheets

(56) References Cited

U.S. PATENT DOCUMENTS

2016/0041982 A1* 2/2016 He ............... G06F 16/9535
707/728

OTHER PUBLICATIONS

"Learning to Re-rank Web Search Results with Multiple Pairwise Features", by Kang et al. WSDM'11, Feb. 9-12, 2011, Hong Kong, China. (Year: 2011).*
Ananthanarayanan et al., "Photon: Fault-tolerant and Scalable Joining of Continuous Data Streams," SIGMOD 13, ACM, Jun. 22-27, 2013, 12 pp.
Bai et al., "Learning to Rank with (a Lot of) Word Features," Information Retrieval, vol. 13, No. 3, Jun. 2010, 24 pp.
Battelle, "The Search: how Google and Its Rivals Rewrote the Rules of Business and Transformed our Culture," Penguin, 2005, 14 pp. (Applicant points out, in accordance with MPEP 609.04(a), that the year of publication, 2005, is sufficiently earlier than the effective U.S. filing date, so that the particular month of publication is not in issue.).
Bishop, "Pattern Recognition and Machine Learning," Springer, 2006, 758 pp. (Applicant points out, in accordance with MPEP 609.04(a), that the year of publication, 2006, is sufficiently earlier than the effective U.S. filing date, so that the particular month of publication is not in issue.).
Blum et al., "Beating the Hold-Out: Bounds for K-fold and Progressive Cross-Validation," Proceedings of the 12th Annual Conference on Computational Learning Theory, 1999, 6 pp. (Applicant points out, in accordance with MPEP 609.04(a), that the year of publication, 1999, is sufficiently earlier than the effective U.S. filing date, so that the particular month of publication is not in issue.).
Broder et al., "A Semantic Approach to Contextual Advertising," SIGIR '07, ACM, Jul. 23-27, 2007, 8 pp.
Burges et al., "Learning to Rank using Gradient Descent," Proceedings of the 22nd International Conference on Machine Learning, 2005, 8 pp. (Applicant points out, in accordance with MPEP 609.04(a), that the year of publication, 2005, is sufficiently earlier than the effective U.S. filing date, so that the particular month of publication is not in issue.).
Chakrabarti et al., "Contextual Advertising by Combining Relevance with Click Feedback," WWW 2008, ACM, Apr. 21-25, 2008, 10 pp.
Ciaramita et al., "Online Learning from Click Data for Sponsored Search," WWW 2008, ACM, Apr. 21-25, 2008, 10 pp.
Duan et al., "An Empirical Study on Learning to Rank of Tweets," Proceedings of the 23rd International Conference on Computational Linguistics (Coling 2010), Aug. 2010, 9 pp.
Edelman et al., "Internet Advertising and the Generalized Second Price Auction: Selling Billions of Dollars Worth of Keywords," National Bureau of Economic Research, Working Paper 11765, Nov. 2005, 22 pp.
Evans, "The Online Advertising Industry: Economics, Evolution, and Privacy," Journal of Economic Perspectives, vol. 23, No. 3, Apr. 2009, 26 pp.
Fawcett, "An introduction to ROC analysis," Pattern Recognition Letters, vol. 27, Dec. 19, 2005, 14 pp.
Freund et al., "An Efficient Boosting Algorithm for Combining Preferences," Journal of Machine Learning Research, vol. 4, Nov. 2003, 37 pp.
Graepel et al., "Web-Scale Bayesian Click-Through Rate Prediction for Sponsored Search Advertising in Microsoft's Bing Search Engine," 27th International Conference on Machine Learning, Jun. 21-24, 2010, 8 pp.
He et al., "Practical Lessons from Predicting Clicks on Ads at Facebook," ADKDD '14, ACM, Aug. 24-27, 2014, 9 pp.
Hong et al., "Learning to Rank Social Update Streams," SIGIR '12, Aug. 12-16, 2012, ACM, 10 pp.
Jansen et al., "Sponsored search: an overview of the concept, history, and technology," International Journal of Electronic Business, vol. 6, No. 2, 2008, 18 pp. (Applicant points out, in accordance with MPEP 609.04(a), that the year of publication, 2008, is sufficiently earlier than the effective U.S. filing date, so that the particular month of publication is not in issue.).
Karimzadehgan et al., A Stochastic Learning-To-Rank Algorithm and its Application to Contextual Advertising, WWW 2011, ACM, Mar. 28-Apr. 1, 2011, 10 pp.
Lacerda et al., "Learning to Advertise," SIGIR '06, ACM, Aug. 6-11, 2006, 8 pp.
Liu et al., "Learning to Rank for Information Retrieval," Foundations and Trends in Information Retrieval, vol. 3, No. 3, 2009, 109 pp. (Applicant points out, in accordance with MPEP 609.04(a), that the year of publication, 2009, is sufficiently earlier than the effective U.S. filing date, so that the particular month of publication is not in issue.).
Mikolov et al., "Efficient Estimation of Word Representations in Vector Space," arXiv:1301.3781v3, Sep. 7, 2013, 12 pp.
Murdock et al., "A Noisy-Channel Approach to Contextual Advertising," ADKDD '07, ACM, Aug. 12, 2007, 7 pp.
Nguyen et al., "Applying Hidden Topics in Ranking Social Update Streams on Twitter," 2013 IEEE RIVF Conference on Computing & Communication Technologies—Research, Innovation, and Vision for the Future (RIVF), Nov. 10-13, 2013, 6 pp.
Platt, "Probabilistic Outputs for Support Vector Machines and Comparisons to Regularized Likelihood Methods," Advances in Large Margin Classifiers, Mar. 26, 1999, 11 pp.
Ratnaparkhi et al., "A hidden class page-ad probability model for contextual advertising," WWW 2008, Apr. 21-25, 2008, 7 pp.
Ribeiro-Neto et al., "Impedance Coupling in Content-targeted Advertising," SIGIR '05, Aug. 15-29, 2005, 8 pp.
Richardson et al., "Predicting Clicks: Estimating the Click-Through Rate for New Ads," WWW 2007, ACM, May 8-12, 2007, 9 pp.
Sculley, "Combined Regression and Ranking," KDD '10, ACM, Jul. 25-28, 2010, 9 pp.
Shanahan et al., "Digital Advertising: An Information Scientist's Perspective," Advanced Topics in Information Retrieval, Springer, 2011, 30 pp. (Applicant points out, in accordance with MPEP 609.04(a), that the year of publication, 2011, is sufficiently earlier than the effective U.S. filing date, so that the particular month of publication is not in issue.).
Zhang et al., "Transductive Learning for Real-Time Twitter Search," Proceedings of the Sixth International AAAI Conference on Weblogs and Social Media, Jun. 4-7, 2012, 4 pp.
Edelman et al., "Internet Advertising and the Generalized Second-Price Auction: Selling Billions of Dollars Worth of Keywords," The American Economic Review, vol. 97, No. 1, Mar. 2007, 18 pp.

* cited by examiner

CLICK-THROUGH PREDICTION FOR TARGETED CONTENT

This application claims the benefit of U.S. Provisional Application No. 62/173,249, filed Jun. 9, 2015, the entire contents of which are incorporated herein by reference.

BACKGROUND

Computing devices, such as smartphones, laptops, and desktop computers, have enabled users to generate, distribute, and consume user-generated content across a broad range of topics and geographic areas. Information distribution platforms may allow users to identify specific topics of interest and share information related to the topics in a real- or near real-time manner. For example, an information distribution platform may allow users to label user-generated content with tags, such as hashtags, that identify or otherwise associate a particular topic with the user-generated content. In this way, information distribution platforms may allow users to search for user-generated content associated with a particular topic based on a hashtag. The operators of such information distribution platforms may monetize by distributing advertisements along with the user-shared information. However, the context into which an advertisement can be placed updates dynamically and may not replicate, thereby increasing the difficulty of distributing relevant advertisements likely to be selected by the particular user who receives the advertisement.

SUMMARY

In one example, a method includes receiving, by a computing device and from a client device of a user, a request for one or more advertisements from a set of advertisements to display at the client device with a set of messages, wherein the set of messages is associated with the user in a social network messaging service. The method further includes determining, by the computing device, using a machine learning model that is based at least in part on a point-wise learning model and a pair-wise learning model, a probability that the user will select a candidate advertisement from the set of advertisements. The method further includes determining, by the computing device, based at least in part on the probability that the user will select the candidate advertisement, a candidate score associated with the candidate advertisement. The method also includes determining, by the computing device, that the candidate score satisfies a threshold score, and sending, by the computing device and for display at the client device with the set of messages, the candidate advertisement.

In another example, a computing device includes at least one processor and at least one non-transitory computer-readable storage medium storing instructions that are executable by the at least one processor to: receive, from a client device of a user, a request for one or more advertisements from a set of advertisements to display at the client device with a set of messages, wherein the set of messages is associated with the user in a social network messaging service. The instructions may be further executable by the at least one processor to using a machine learning model that is based at least in part on a point-wise learning model and a pair-wise learning model, a probability that the user will select a candidate advertisement from the set of advertisements. The instructions may be further executable by the at least one processor to determine, based at least in part on the probability that the user will select the candidate advertisement, a candidate score associated with the candidate advertisement. The instructions may be further executable by the at least one processor to determine that the candidate score satisfies a threshold score and send, for display at the client device with the set of messages, the candidate advertisement.

In another example, an apparatus includes means for receiving, from a client device of a user, a request for one or more advertisements from a set of advertisements to display at the client device with a set of messages, wherein the set of messages is associated with the user in a social network messaging service. The apparatus further includes means for determining, using a machine learning model that is based at least in part on a point-wise learning model and a pair-wise learning model, a probability that the user will select a candidate advertisement from the set of advertisements. The apparatus further includes means for determining, based at least in part on the probability that the user will select the candidate advertisement, a candidate score associated with the candidate advertisement. The apparatus further includes means for determining that the candidate score satisfies a threshold score and means for sending, for display at the client device with the set of messages, the candidate advertisement.

In another example, a non-transitory computer-readable storage medium is encoded with instructions that, when executed, cause at least one processor of a computing device to receive, from a client device of a user, a request for one or more advertisements from a set of advertisements to display at the client device with a set of messages, wherein the set of messages is associated with the user in a social network messaging service. The executed instructions further cause the at least one processor to determine, using a machine learning model that is based at least in part on a point-wise learning model and a pair-wise learning model, a probability that the user will select a candidate advertisement from the set of advertisements. The executed instructions further cause the at least one processor to determine, based at least in part on the probability that the user will select the candidate advertisement, a candidate score associated with the candidate advertisement. The executed instructions further cause the at least one processor to determine that the candidate score satisfies a threshold score and send, for display at the client device with the set of messages, the candidate advertisement.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
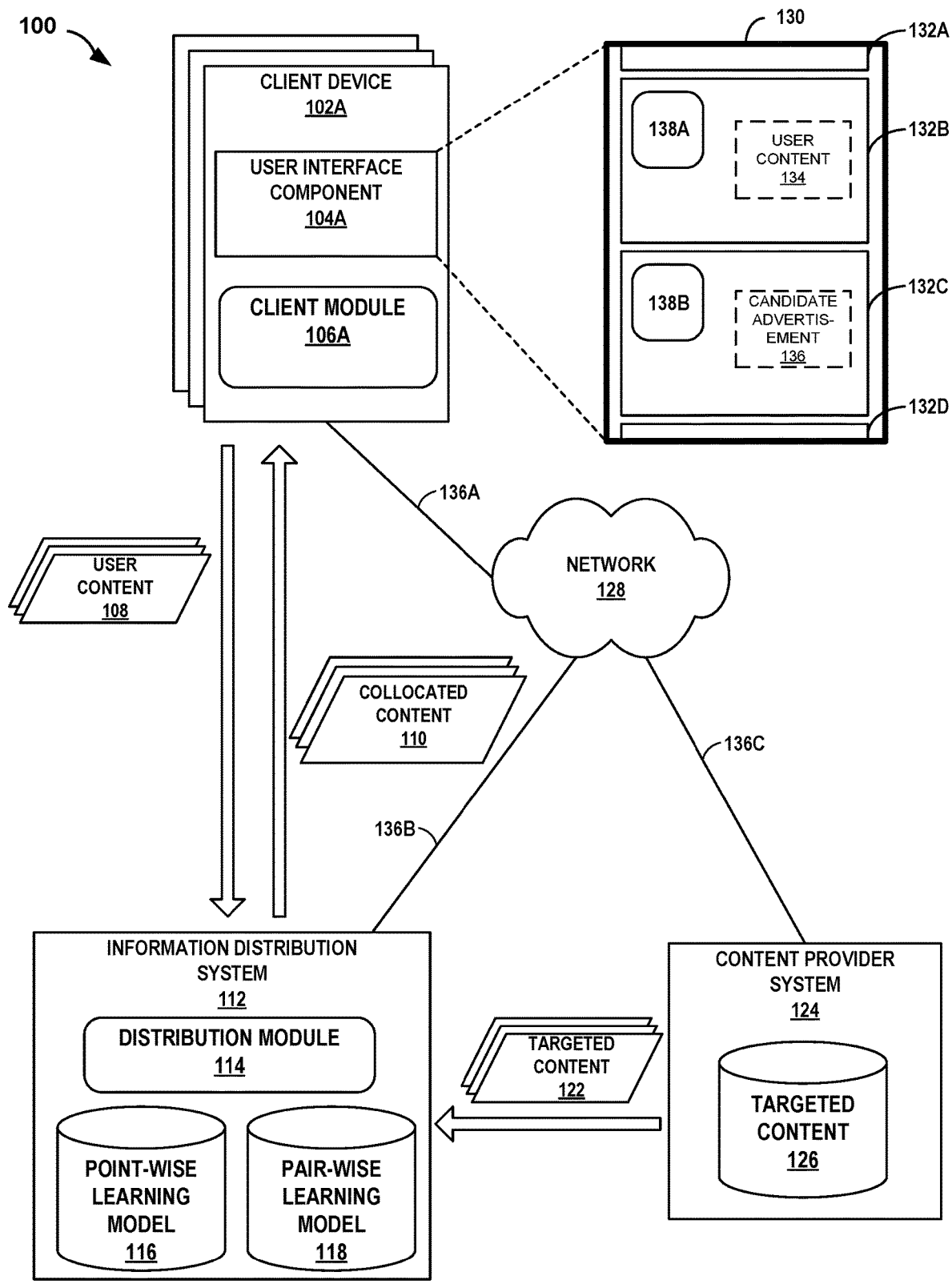
FIG. 1 is a conceptual diagram illustrating a system that is configured to select candidate advertisements for display on a client device based on a point-wise learning model and a pair-wise learning model, in accordance with one or more aspects of the present disclosure.

Techniques of the disclosure are directed to selecting candidate advertisements for display on a client device based a probability that the user will select a particular candidate advertisement of the candidate advertisements. In determining the probability, an information distribution system may utilize both a point-wise learning model and a pair-wise learning model. The point-wise learning model may be based on how likely it is that a particular user of the client device would select the candidate advertisement if presented with the candidate advertisement. The pair-wise learning model may be based on how likely it is that the particular user of the client device would select the candidate advertisement instead of a different candidate advertisement if presented with both candidate advertisements. The information distribution system may then determine a score based on the determined probability and present the user with the candidate advertisement if the determined score satisfies a threshold.

In accordance with the techniques of this disclosure, in general, a point-wise learning model may be any prediction model suitable for use in predicting the probability of selecting a single advertisement if the user was presented with the single advertisement without taking into account any other advertisements that may be displayed to the user in the same session. For instance, the point-wise model may determine the probability based on aspects of the user's profile, accounts that the user follows on a social media platform, similar advertisements that may or may not have been selected by the user in the past, and/or any other detail that the point-wise model could reasonably utilize in determining the probability of selecting the single advertisement. Further, in general, a pair-wise learning model may be any prediction model suitable for use in predicting the probability of selecting a single advertisement over a different advertisement if both advertisements are presented to the user at a similar time and/or in a similar context. In other words, the point-wise learning model may be based on the evaluation of the candidate advertisement itself using one or more of the factors as described above, while the pair-wise learning model may be based on comparisons between multiple different candidate advertisements.

By using both a point-wise learning model and a pair-wise learning model, the information distribution system may more accurately predict which advertisements will be selected by a user. Traditional computational advertising typically appears in two forms. The first form is a sponsored search that places advertisements onto the search result page when a query is issued to a search engine. The second form is contextual advertising that places advertisements onto a regular, static Web page. Compared with these two paradigms, placing advertisements into a dynamic, constantly updating message stream may be challenging. In such an environment, the information distribution system may place every advertisement into a unique context. To efficiently distribute advertisements, an information distribution system may utilize machine learning models tailored to each particular user, but the information available for training such a machine learning model may be sparse.

Rather than statically presenting advertisements or using a singular model to determine a likelihood that a user will select an advertisement, the techniques of this disclosure describe a learning-to-rank method that addresses the sparsity of training signals while also being trained and updated online. The techniques described herein utilize both a point-wise learning model and a pair-wise learning model, both of which can be dynamically updated, to more efficiently and accurately select candidate advertisements to be displayed at a client device. The information distribution system may further utilize these models to provide likelihoods to advertisers such that the advertisers can propose appropriate bid prices for such advertisements. The information distribution system may also combine the accurate probabilities determined using the two models with a received bid price to determine the most profitable advertisements that may be displayed for each user.

FIG. 1 is a conceptual diagram illustrating a system 100 for selecting candidate advertisements for display on a client device 102A based on point-wise learning model 116 and pair-wise learning model 118, in accordance with one or more aspects of the present disclosure. System 100 includes client device 102A, information distribution system 112, content provider system 124, and network 128.

Network 128 represents any communication network (e.g., public, private, commercial, governmental, or residential) that communicatively links two or more computing devices or systems for the transmission of information. For example, network 128 may be a wireless and/or wired network for transmitting data between two or more computing devices located at two or more different physical locations. In some examples, network 128 may represent the Internet. Client device 102A, information distribution system 112, and content provider system 124 may send and receive data via network 128 using various suitable communication techniques. For instance, data may be transmitted between the devices using communication links 136A-136C, which may be wired and/or wireless. Network 128 may include any required hardware for communicatively linking computing client device 102A, information distribution system 112, and content provider system 124. For example, network 128 may include various switches, hubs, routers, and other network equipment that provides for the exchange of information between the devices.

Client device 102A represents any type of personal computing device from which a person can view, listen to, feel, or otherwise obtain output based on information received via a network, such as network 128. For example, client device 102A may be a laptop computer, a mobile telephone, phones, a tablet computers, a set-top box, a desktop computer, a server, a mainframe, a wearable device (e.g., a watch, computerized glasses, and the like), a personal digital assistant (PDA), a gaming system, a media player, an e-book reader, a television platform, a digital media player, an automobile navigation and/or entertainment system, or any other type of mobile and/or non-mobile computing device that is configured to communicate (e.g., transmit and receive data) across a network and output information received via the network to a user.

Client device 102A includes user interface component 104A. User interface component 104A may include various technologies for receiving input from, and/or outputting information to, a user of user device 10. For example, user interface component 20 may include a microphone, a touch screen or other type of presence-sensitive screen, and other types of sensors and input devices for receiving input from a user. User interface component 104A may include a display (e.g., liquid crystal (LCD), light emitting diode (LED), organic light-emitting diode (OLED), or any other type of display), a speaker, a haptic feedback device, or any other type of output device for outputting visible, audible, and/or haptic feedback type information to a user of client device 104A. Although illustrated as a presence-sensitive display integrated with client device 102A, in some examples, user interface component 104A may be a display device, such as a monitor integrated in a laptop computer, or a standalone monitor coupled to a desktop computing device, to name only a few examples.

User interface component 104A may provide a user interface from which a user may interact with client device 102A to cause client device 104A to perform one or more operations. For example, user interface component 104A may give a user access to a service, provided by information distribution system 112, for receiving content (e.g., social media, news, television, streaming audio, streaming video, or other types of content) distributed across network 128. As further described in this disclosure, information distribution system 112 may provide content via network 128 to client device 102A. Client device 102A may process and output the content as one or more graphical images, sounds, and haptic-feedback sensations, at user interface component 104A.

Client device 102A may include a client module 106A. Client module 106A may send information generated by a user to and receive information from an information network provided by information distribution system 112. For instance, a user may have a user account stored at information distribution system 112. The user account may include a unique identifier (e.g., a username) for the user, authentication credentials, and personal information (e.g., name, phone number, email address, home address, to name only a few examples). Client module 106A may authenticate with information distribution system 112 based on authentication credentials provided by the user to client device 102A.

In some examples, client module 106A may provide a graphical user interface (GUI) that enables a user to generate or otherwise compose user content that client module 106A sends to information distribution system 112. Such user content may include text, images, video, and/or audio information. In some examples, a user may compose a message that includes various content. In addition to content, a message may include one or more hashtags and/or mention tags. In some examples, a hashtag may represent or otherwise identify a particular topic associated with the content of a message. As such, a user composing a message on a particular topic may associate hashtag for the topic with the message. A mention tag may represent or otherwise identify a particular user that has a corresponding user account at information distribution system 112. A user composing a message who wishes to refer to or address another particular user may associate a mention tag for the particular user with the message. When a user generates user content 108, client module 106A may send user content 108 to information distribution system 112, which may process and/or distribute the user content as further described in this disclosure.

Client module 106A may enable the user to perform one or more functions associated with user content. For instance, client module 106A may enable a user to "share," "re-share," "read," and "follow" content as well as "follow" and "mention" other users. In some examples, "sharing" a message or content may refer to composing an original message or original content that is subsequently distributed by information distribution system 112 to other users. In some examples, "re-sharing" a message or content may refer to an operation initiated by a user to re-post a message or content that was originally generated by another user. In some examples, "reading" a message or content may refer to an activity of a user to view the message or content. In some examples, "following" may refer to an operation initiated by a user to subscribe to messages and/or user content of another user. As such, a user that follows a particular user may receive updates of messages and/or user content generated by the particular user. In some examples, "mentioning" a particular user may refer to an operation initiated by a user to identify or otherwise associate the particular user with a message or user content.

Client module 106A may perform operations described herein using software, hardware, firmware, or a mixture of both hardware, software, and firmware residing in and executing by client device 102A or at one or more other remote computing devices. As such, client module 106A may be implemented as hardware, software, and/or a combination of hardware and software. Client device 102A may execute client module 106A as or within a virtual machine executing on underlying hardware. Client module 106A may be implemented in various ways. For example, client module 106A may be implemented as a downloadable or pre-installed application or "app." In another example, client module 106A may be implemented as part of an operating system of client device 102A.

As shown in FIG. 1, system 100 also includes information distribution system 112. Information distribution system 112 may implement techniques of this disclosure to select candidate advertisements for display on a client device 102A based on point-wise learning model 116 and pair-wise learning model 118. Information distribution system 112 may be implemented as one or more computing devices, including but not limited to one or more desktop computers, laptop computers, mainframes, servers, cloud computing systems, and the like.

Information distribution system 112 may include data and one or more modules that, when executed, perform one or more operations. For example purposes, information distribution system 112 includes distribution module 114, point-wise learning model 116, and pair-wise learning model 118; however, information distribution system 112 may include more or fewer modules or data in other examples. For example, information distribution system may include a repository that includes user data. The user data may include data representing user accounts and demographic data about each user. As described above, a user account for a user of information distribution system 112 may include is not limited to: a user name, password, phone number, email address, and home address. In some examples, the user data may also include, current location of the user, devices authenticated with the user, interests of the user, history of content generated by the user, history of content read and/or followed by a user, hashtags and/or mention tags used by the user, other users followed by the user, other users following the user, private messages sent and/or received by the user, and/or search history of the user, to name only a few examples.

Demographic data may include personally sensitive and/or personally identifiable information about users of information distribution system 112, which may be referred to as "sensitive data." In some instances, information distribution system 112 only shares demographic data of a user if the user expressly "opts-in" or provides an explicit indication of user input that authorizes information distribution system 112 to share such sensitive data with third parties, such as content providers or other entities. In some examples, information distribution system 112 provides the user with full disclosure and requires full consent of the user before collecting and/or sharing any demographic and/or sensitive data. In some examples, a particular jurisdiction may have specific privacy requirements with respect to demographic data. Information distribution system 112, in such examples, may implement controls that prevent or restrict the sharing of demographic data in order to comply with privacy requirements of a particular jurisdiction.

Point-wise learning model 116 may include a probabilistic classifier that assigns a posterior click-through probability to an advertisement if the advertisement is displayed in a user's current session of their timeline. In some examples, the training data for point-wise learning model 116 may be made up of all historical impressions shown across all users. In other examples, the training data for point-wise learning model 116 may be made up of historical impressions for a single user or a group of users.

Point-wise learning model 118 may include a probabilistic classifier that assigns a posterior click-through probability to an advertisement if the advertisement is displayed in a user's current session of their timeline along with a second advertisement. For example, two advertisements are more comparable if they are presented to the same user in one session. For the purposes of this disclosure, two advertisements may be presented in the same session when any of one or more of the following are true: when the advertisements are both output for display by a client device on the same graphical user interface, when the advertisements are both presented within a predetermined amount of time of one another, when the advertisements are both presented in an application without the application being closed, when the advertisements are sent in the same group of messages to the computing device, or any other reasonable understanding of a session in light of this disclosure. Two advertisements in the same session may have similar contexts, thus directly optimizing, or otherwise improving, the preference order between the two advertisements can address the sparsity challenge that advertisements are shown in different unique contexts.

Information distribution system 112 may also include distribution module 114. Distribution module 114 may construct and maintain information generated by users and/or operators of information distribution system 112. Distribution module 114 may receive user content 108 from one or client devices, and store and organize the user content in the information network. The user content may be stored and organized using any number of datastores and data structures, such as but not limited to graphs, lists, tables, a Relational Database Management System (RDBMS), Object Database Management System (ODBMS), and/or Online Analytical Processing (OLAP) system.

In some examples, distribution module 114 may send targeted content to client devices for display. Targeted content may include, but is not limited to advertisements, offers, rewards, discounts, political information, public interest information, entertainment information, sports information, or any other informational content. As shown in FIG. 1, distribution module 114 may send collocated content 110 that includes targeted content and/or distributed user content from other users. Client module 106A may generate a graphical user interface 130 for display that includes information included in collocated content 110, such as user content 134 and candidate advertisement 136. In some examples, user interface 130 outputs information in a sequence or stream of "cards" or graphical user elements 132A-132D. The sequence or stream of "cards" may be ordered in chronological or reverse chronological order, in some examples. As shown in FIG. 1, card 132B includes an icon 138A and user content 134. Card 132C includes an icon 138B and candidate advertisement 136. Icon 138A may correspond to the particular user that shared or re-shared user content 134. Icon 138B may correspond to the particular content provider that provided candidate advertisement 136.

As shown in FIG. 1, candidate advertisement 136 may be interspersed with other user content in graphical user interface 130. Accordingly, if a user is viewing a sequence or stream of cards, such as cards 132, information distribution system 112 may also include one or more cards with targeted content. As an example, if the sequence or stream of cards is associated with a specific topic, targeted content that is relevant to the specific topic may be included in the sequence or stream of cards.

In some examples, information distribution system 112 may receive targeted content from content providers operating one or more content provider systems, such as targeted content 122 from content provider system 124. Content providers may include advertising agencies, companies, public interest organizations, governments, individual persons, and political candidates, to name only a few examples. Such content providers may be interested in providing target content to users of information distribution system 112. More particularly, content providers may be interested in generating and displaying targeted content to specific audiences (e.g., sets of users of information distribution system 112) that are highly engaged or interested in a particular event, controversy, person, or topic.

Content provider system 124 may send, submit or otherwise provide targeted content 122, selected or generated by the content provider, to information distribution system 112. In some examples, content provider system may also provide a bid or price that indicates an amount of money that the content provider will pay for targeted content 122 to be output for display at one or more client devices of users associated with the hashtag for which the trending score satisfies the threshold. Information distribution system 112 may receive bids from multiple different content provider systems to display targeted content. Information distribution system 112 may determine the highest bid send the targeted content of the content provider with the winning bid to client devices of one or more users associated with the hashtag. In accordance with the techniques of this disclosure, targeted content 122 may be a set of advertisements that may be output by a specific client device, such as client device 102A.

In accordance with techniques of this disclosure, information distribution system 112 may receive, from client device 102A of a user, a request for one or more advertisements from a set of advertisements to display at client device 102A with a set of messages (e.g., cards 132A and 132B). The set of messages may be associated with the user in a social network messaging service. For instance, while the user is scrolling through the messages in the social network messaging service, client device 102A may automatically send a request to information distribution system 112 for information distribution system 112 to send an advertisement which client device 102A may display at graphical user interface 130.

As described above, content provider system 124 may provide the set of advertisements to information distribution system in targeted content 122, which may be a subset or the entire set of advertisements in targeted content 126. Targeted content 126 may be a database of advertisements that may be displayed by client device 102A. Targeted content 122 may be a subset of targeted content 126 based on the social media platform currently in use by client device 102A, the demographic information of a user of client device 102A, or any other function that limits the amount of possible advertisements sent to information distribution system 112.

Using a machine learning model that is based at least in part on point-wise learning model 116 and pair-wise learning model 118, distribution module 114 may determine a probability that the user will select a candidate advertisement from the set of advertisements included in targeted content 122. For instance, distribution module 114 may select a first candidate advertisement from targeted content 122. Using the data included in point-wise learning model 116, distribution module 114 may determine an initial probability or ranking for the candidate advertisement. Using the data included in pair-wise learning model 118, distribution module 114 may adjust the initial probability or ranking based on how the candidate advertisement may rank against other candidate advertisements present in the set of advertisements included in targeted content 122. For example, the first candidate advertisement may initially have the third-highest probability of being selected based on point-wise learning model 116. However, using pair-wise learning model 118, distribution module 114 may determine that the first candidate advertisement is likely to be selected over the candidate advertisements with the first- and second-highest probabilities if the first candidate advertisement was shown in the same session as these candidate advertisements. As such, distribution module 114 may adjust the probability that the user would select the first candidate advertisement by increasing the probability as indicated by point-wise learning model 116 alone. A more in-depth description with relation to how distribution module 114 may utilize point-wise learning model 116 and pair-wise learning model 118 is shown below with respect to FIG. 2.

Distribution module 114 may determine, based at least in part on the probability that the user will select the candidate advertisement, a candidate score associated with the candidate advertisement. In some examples, the candidate score may be the determined probability itself. In other examples, distribution module 114 may determine the score as a ranking value of the probabilities when compared to other advertisements in the set of advertisement. In other examples, the score may be a combination of the two systems above or any other scoring system that may assign a score to a candidate advertisement based on the probability that the user will select the candidate advertisement.

Distribution module 114 may determine that the candidate score satisfies a threshold score. For instance, in certain non-limiting examples, distribution module 114 may not send any advertisement to client device 102A if the probability that the user will select the advertisement is below 20%. In other instances, distribution module 114 may not send any advertisement to client device 102A if the advertisement ranks outside of the top-five most likely advertisements that a user may select. It should be noted that the thresholds of 20% and the top-five ranks are given only as example illustrations. The threshold may be any percentage, rank, or other score format deemed reasonable by information distribution system 112 or client device 102A. By comparing the determined score to a threshold score, distribution module 114 may reduce network traffic for information sent over network 128. This may enable a higher level of efficiency and reduced battery consumption in both information distribution system 112 and client device 102A.

If the candidate score for the candidate advertisement satisfies the threshold score, distribution module 114 may send the candidate advertisement for display at client device 102A with the set of messages. For instance, distribution module 114 may send collocated content 110 to client device 102A. Collocated content 110 may include the set of messages, such as user content 134 to be shown in card 132B in graphical user interface 130. Collocated content 110 may also include candidate advertisement 136, which has a candidate score that satisfies the threshold score, to be displayed in card 132C in graphical user interface 130 along with card 132B.

Rather than statically presenting advertisements or using a singular model to determine a likelihood that a user will select an advertisement, the techniques of this disclosure describe distribution module 114 performing a learning-to-rank method which addresses the sparsity of training signals while also being trained and updated online. In the techniques described herein, distribution module 114 utilizes both point-wise learning model 116 and pair-wise learning model 118, both of which can be dynamically updated, to more efficiently and accurately select candidate advertisements to be displayed at client device 102A. Information distribution system 112 may further utilize models 116 and 118 to provide likelihoods to advertisers such that the advertisers can propose appropriate bid prices for such advertisements. Information distribution system may also combine the accurate probabilities determined using models 116 and 118 with the received bid price to determine the most profitable advertisements that may be displayed for each user.

Figure 2:
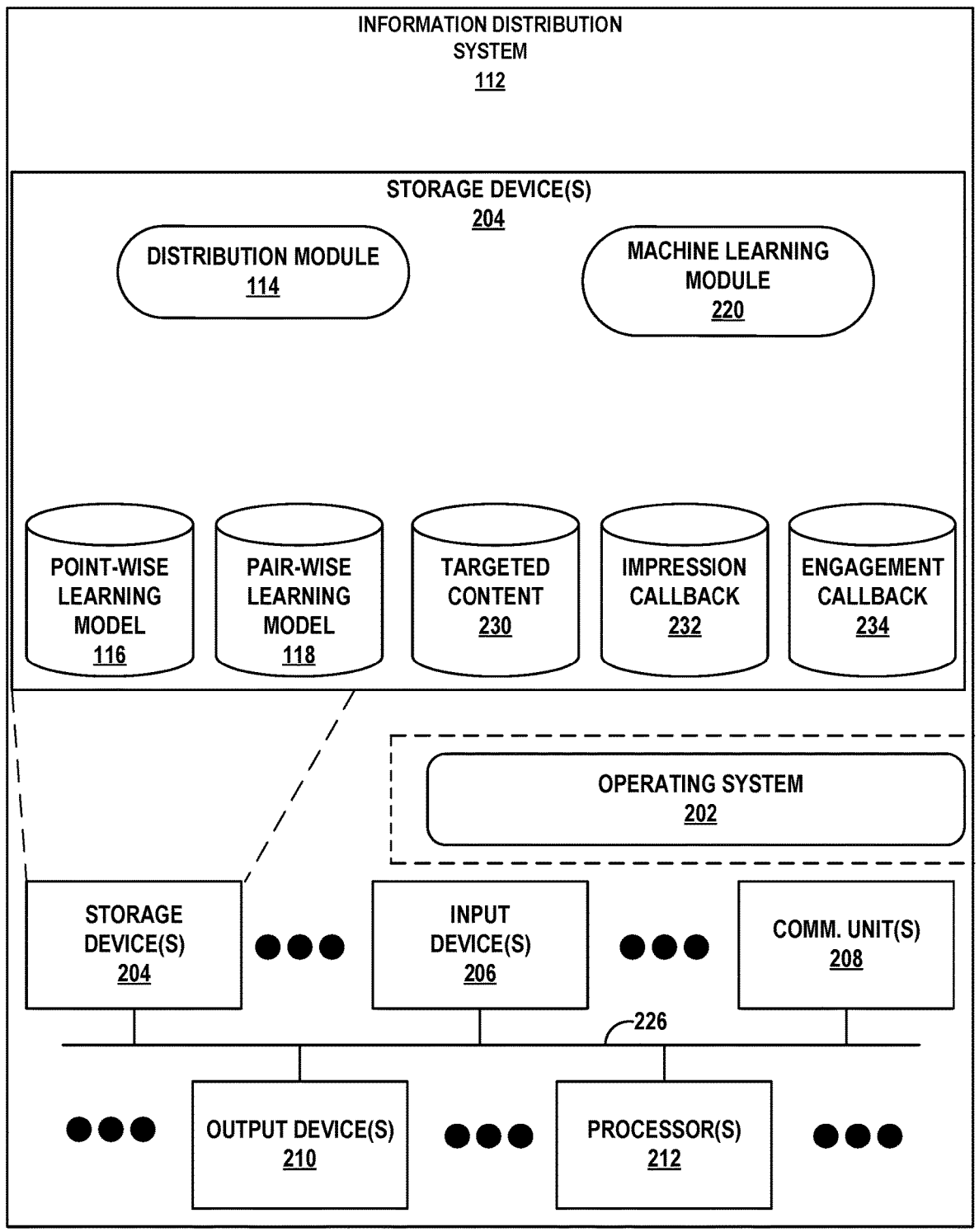
FIG. 2 is a block diagram illustrating further details of an example information distribution system that is configured to select candidate advertisements for display on a client device based on a point-wise learning model and a pair-wise learning model, in accordance with one or more aspects of the present disclosure.

FIG. 2 is a block diagram illustrating further details of an example information distribution system 112 for selecting candidate advertisements for display on a client device based on a point-wise learning model and a pair-wise learning model, in accordance with one or more aspects of the present disclosure. Information distribution system 112 of FIG. 2 is described below within the context of FIG. 1. FIG. 2 illustrates only one particular example of information distribution system 112, and many other examples of information distribution system 112 may be used in other instances and may include a subset of the components included in example information distribution system 112 or may include additional components not shown in FIG. 1.

As shown in the example of FIG. 2, information distribution system 112 includes distribution module 114, machine learning module 220, point-wise learning model 116, pair-wise learning model 118, targeted content 230, one or more impression callback times 232, one or more engagement callback times 234, operating system 202, one or more storage devices 204, one or more input devices 206, one or more communication units 208, one or more output devices 210, one or more processors 212, and one or more communication channels 226.

Storage devices 204, in some examples, include one or more computer-readable storage media. In some examples, storage devices 204 represent non-transitory computer readable storage medium that store instructions later executed by one or more processors 212 during operation of information distribution system 112. For example, storage devices 204 may store program instructions and/or information (e.g., data) associated with modules and/or components 114, 116, 118, 220, 230, 232, 234, and 202.

Communication channels 226 may interconnect each of the components 202-234 for inter-component communications (physically, communicatively, and/or operatively). In some examples, communication channels 226 may include a system bus, a network connection, an inter-process communication data structure, or any other method for communicating data.

One or more input devices 206 of information distribution system 112 may receive input and one or more input devices 206 may generate output. Examples of input are tactile, audio, and video input and examples of output are tactile, audio, and video output. In one example, input devices 206 include a presence-sensitive display, touch-sensitive screen, mouse, keyboard, voice responsive system, video camera, microphone, or any other type of device for detecting input from a human or machine. Whereas in one example, output devices 210 include a presence-sensitive display, sound card, video graphics adapter card, speaker, cathode ray tube (CRT) monitor, liquid crystal display (LCD), or any other type of device for generating output to a human or machine.

One or more communication units 208 may allow information distribution system 112 to communicate, via one or more wired and/or wireless networks, with external devices and/or systems. For example, communication units 208 may transmit and/or receive network signals being transmitted and received other devices and/or systems connected to network 128. Examples of communication units 208 include network interface cards (e.g., Ethernet card), optical transceivers, radio frequency transceivers, global positioning system (GPS) receivers, or any other type of device that can send and/or receive information via a network. Other examples of communication units 208 may include long and short wave radios, cellular data radios, wireless network radios, as well as universal serial bus (USB) controllers.

One or more storage devices 204 of information distribution system 112 may store information or instructions that information distribution system 112 processes during operation of information distribution system 112. For example, storage devices 204 may store data that modules or components may access during execution at information distribution system 112. In some examples, storage devices 204 are temporary memories, meaning that a primary purpose of storage devices 204 is not long-term storage.

Storage devices 204 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 204 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

One or more processors 212 may implement functionality and/or execute instructions within information distribution system 112. For example, processors 212 on information distribution system 112 may receive and execute instructions stored by storage devices 204 that execute the functionality of modules 114, 220, and 202. The instructions executed by processors 212 may cause information distribution system 112 to read/write/etc. information, such as one or more data files at point-wise learning model 116, pair-wise learning model 118, targeted content 230, impression callback 232, and/or engagement callback 234 and stored within storage devices 204 during program execution. Processors 212 may execute instructions of modules 114, 220, and 202 to cause information distribution system 112 to perform the operations described in this disclosure. That is, modules 114, 220, and 202 may be operable by processors 212 to perform various actions or functions of information distribution system 112, for instance, selecting candidate advertisements for display on a client device based on a point-wise learning model and a pair-wise learning model, in accordance with one or more aspects of the present disclosure.

As shown in FIG. 2, information distribution system 112 includes machine learning module 220. Machine learning module 220 may operate for updating point-wise learning model 116 and pair-wise learning model 118. For instance, in response to receiving impression callback 232 and engagement callback 234, machine learning module 220 may update point-wise learning model 116 and pair-wise learning model 118 such that distribution module 114 may effectively select candidate advertisements for display at a client device.

In accordance with techniques of this disclosure, distribution module 114 may receive, from a client device of a user, a request for one or more advertisements from a set of advertisements to display at the client device with a set of messages. The set of messages may be associated with the user in a social network messaging service. For instance, while the user is scrolling through the messages in the social network messaging service, the client device may automatically send a request to distribution module 114 of information distribution system 112 for information distribution system 112 to send an advertisement which the client device may display at a graphical user interface. Distribution module 114 may utilize communication units 208 to receive this request.

Distribution module 114 may receive targeted content 230 from a content provider system. Distribution module 114 may intermittently receive advertisements to add to the datastore of targeted content 230. As such, targeted content 230 may contain an up-to-date collection of potential advertisements that may be evaluated for the purpose of determining the likelihood that a user may select the respective advertisement.

Using a machine learning model that is based at least in part on point-wise learning model 116 and pair-wise learning model 118, distribution module 114 may determine a probability that the user will select a candidate advertisement from the set of advertisements included in targeted content 230. For instance, distribution module 114 may select a first candidate advertisement from targeted content 230. Using the data included in point-wise learning model 116, distribution module 114 may determine an initial probability or ranking for the candidate advertisement. Using the data included in pair-wise learning model 118, distribution module 114 may adjust the initial probability or ranking based on how the candidate advertisement may rank against other candidate advertisements present in the set of advertisements included in targeted content 230. For example, the first candidate advertisement may initially have the highest probability of being selected based on point-wise learning model 116. However, using pair-wise learning model 118, distribution module 114 may determine that the first candidate advertisement is less likely to be selected over the candidate advertisements with the second- and third-highest probabilities if the first candidate advertisement was shown in the same session as these candidate advertisements. As such, distribution module 114 may adjust the probability that the user would select the first candidate advertisement by decreasing the probability as indicated by point-wise learning model 116 alone.

Machine learning module 220 may update point-wise learning model 116 and pair-wise learning model 118 based on various training instances, or previous instances when the candidate advertisement or an equivalent candidate advertisement was displayed. For instance, when the client device displays the candidate advertisement or an advertisement similar to the candidate advertisement (e.g., regarding the same product, from the same brand, regarding a similar product from a different brand, has a similar motif), the client device may send an indication to distribution module 114 that indicates whether the advertisement was selected. If the advertisement was selected, distribution module 114 may update point-wise learning model 116 to indicate that the user is more likely to select the candidate advertisement in the future. Similarly, if the advertisement was not selected, distribution module 114 may update point-wise learning model 116 to indicate that the user is less likely to select the candidate advertisement in the future.

If the evaluated advertisement was displayed in the same session as a second advertisement, distribution module 114 may further update pair-wise learning model 118. For instance, if the evaluated candidate advertisement (or similar advertisement) was shown in the same session as a second advertisement, and the user selected the candidate advertisement but did not select the second advertisement, distribution module 114 may update pair-wise learning model 118 to indicate that the user is more likely to select the candidate advertisement than the second advertisement. As such, when the candidate advertisement is evaluated in the future, distribution module 114 may adjust the candidate score for the candidate advertisement with relation to the second advertisement as defined in point-wise learning model 116. Similarly, if the user selected the second advertisement but did not select the candidate advertisement, distribution module 114 may update pair-wise learning model 118 to indicate that the user is more likely to select the second advertisement than the candidate advertisement.

Machine learning module 220 may further update models 116 and 118 based on "callbacks," or particular timestamps. For instance, machine learning module 220 may receive an impression callback time 232 that indicates a timestamp when the candidate advertisement from the set of candidate advertisements was displayed at the client device. If the advertisement was selected, machine learning module 220 may further receive an engagement callback time 234 that indicates a timestamp when the candidate advertisement from the set of candidate advertisements was selected by the user at the client device. In such instances, machine learning module 220 may train the machine learning model (i.e., update models 116 and 118) based at least in part impression callback time 232 and engagement callback time 234.

For instance, the difference between impression callback time 232 and engagement callback time 234 may influence the extent to which models 116 and 118 are updated. Specifically, the extent to which the scores in models 116 and 118 are updated may be inversely proportional to the difference between impression callback time 232 and engagement callback time 234. For example, if there is a small difference between impression callback time 232 and engagement callback time 234, the user may have been immediately drawn to the candidate advertisement and especially interested in the content of the candidate advertisement or the product being marketed in the candidate advertisement. As such, if the user was presented with a similar advertisement or the same candidate advertisement in the future, machine learning module 220 may use the quick selection as evidence of the user being highly interested in this type of advertisement. Therefore, machine learning module 220 may greatly increase the corresponding scores in point-wise learning model 116 and/or pair-wise learning model 118 more to reflect the speed at which the user selected the candidate advertisement.

Conversely, if there is a larger difference between impression callback time 232 and engagement callback time 234, the user may have not been drawn to the candidate advertisement right away or the user may have evaluated the candidate advertisement with a hesitation as to whether the candidate advertisement was worthy of exploring deeper. As such, if presented with a similar advertisement or the same candidate advertisement in the future, machine learning module 220 may use the hesitation as evidence of the user being only slightly or moderately interested in this type of advertisement. Therefore, machine learning module 220 may only slightly increase the corresponding scores in point-wise learning model 116 and/or pair-wise learning model 118 more to reflect the slower speed at which the user selected the candidate advertisement.

Machine learning module 220 may receive the training instances from the specific user and update user-specific point-wise learning models and pair-wise learning models. In other instances, point-wise learning model 116 and pair-wise learning models may be used for multiple users with similar demographic information or interests. In such instances, machine learning module 220 may receive a continuous stream of training instances from a plurality of client devices, with each training instance indicating at least one of an impression callback or an engagement callback associated with the candidate advertisement that is displayed at each of the plurality of client devices. Machine learning module may then train models 116 and 118 based at least in part on the continuous stream of training instances that correspond to the candidate advertisement.

For example, for users that have an interest in automobiles, a single point-wise learning model and pair-wise learning model may be utilized for all users with that interest. In this example, machine learning module 220 may update the point-wise learning model and pair-wise learning model for a candidate advertisement displayed to a group of these users, as machine learning module 220 may assume that each user with this similar interest may have a similar reaction to the same advertisement. Conversely, a user who has an interest in automobiles may have different advertisement selection behavior than a user who has an interest in knitting. As such, users who have an interest in knitting may have a different point-wise learning model and pair-wise learning model than the users who have an interest in automobiles. The point-wise learning models and pair-wise learning models may be further customized based on a user's combination of interests. Machine learning module 220 may determine the user's interests based on accounts that the user subscribes to in the social media application.

Distribution module 114 may determine, based at least in part on the probability that the user will select the candidate advertisement, a candidate score associated with the candidate advertisement. In some examples, the candidate score may be the determined probability itself. In other examples, distribution module 114 may determine the score as a ranking value of the probabilities when compared to other advertisements in the set of advertisement. In other examples, the score may be a combination of the two systems above or any other scoring system that may assign a score to a candidate advertisement based on the probability that the user will select the candidate advertisement.

In some examples, the determined score may further be based on a bid price that an advertiser will pay if the user selects the candidate advertisement. In such examples, the determined score may be an expected profit for an operator of information distribution system 112 if distribution module 114 sends the candidate advertisement for display at the client device. For instance, distribution module 114 may determine that the probability that the user will select a given candidate advertisement is 25%. Distribution module 114 may also determine that the advertiser will pay the operator of information distribution system 112 ten dollars if the user selects the candidate advertisement. As such, using this information, distribution module 114 may determine that the expected profit for the operator if distribution module 114 sent the candidate advertisement to the client device for display is two dollars and fifty cents.

Distribution module 114 may determine that the candidate score satisfies a threshold score. For instance, in certain non-limiting examples, distribution module 114 may not send any advertisement to client device 102A if the expected profit from the user selecting the advertisement (e.g., the probability the user selects the advertisement multiplied by the amount the advertiser will pay the operator of information distribution system 112 if the user selects the advertisement) is below two dollars. In other instances, distribution module 114 may not send any advertisement to client device 102A if the advertisement ranks outside of the top-five expected profits. It should be noted that the thresholds of two dollars and the top-five ranks are given only as example illustrations. The threshold may be any percentage, rank, expected profit, or other score format deemed reasonable by information distribution system 112 or client device 102A. By comparing the determined score to a threshold score, distribution module 114 may reduce network traffic for information sent over the network. This may enable a higher level of efficiency and reduced battery consumption in both information distribution system 112 and client device 102A.

If the candidate score for the candidate advertisement satisfies the threshold score, distribution module 114 may send the candidate advertisement for display at client device 102A with the set of messages. For instance, distribution module 114 may send collocated content to client device 102A that includes the set of messages, such as user content to be shown in a card in the graphical user interface. Collocated content 110 may also include the candidate advertisement from targeted content 230, which has a candidate score that satisfies the threshold score, to be displayed in a card in the graphical user interface along with a card that shows user content from the set of messages.

In some examples, distribution module 114 may send the candidate advertisement in a set of candidate advertisements, where each respective candidate advertisement in the set of candidate advertisements has a respective candidate score that satisfies the threshold score. The client device may then select one of the candidate advertisements from the set of candidate advertisements to display with the set of messages.

Rather than statically presenting advertisements or using a singular model to determine a likelihood that a user will select an advertisement, the techniques of this disclosure describe distribution module 114 performing a learning-to-rank method which addresses the sparsity of training signals while also being trained and updated online. In the techniques described herein, distribution module 114 utilizes both point-wise learning model 116 and pair-wise learning model 118, both of which can be dynamically updated, to more efficiently and accurately select candidate advertisements to be displayed at a client device. Information distribution system 112 may further utilize models 116 and 118 to provide likelihoods to advertisers such that the advertisers can propose appropriate bid prices for such advertisements. Information distribution system may also combine the accurate probabilities determined using models 116 and 118 with the received bid price to determine the most profitable advertisements that may be displayed for each user.

By using both a point-wise learning model and a pair-wise learning model, the information distribution system may more accurately predict which advertisements will be selected by a user. Traditional computational advertising typically appears in two forms. The first form is a sponsored search that places advertisements onto the search result page when a query is issued to a search engine. The second form is contextual advertising that places advertisements onto a regular, static Web page. Compared with these two paradigms, placing advertisements into a dynamic, constantly updating message stream may be challenging. In such an environment, the information distribution system may place every advertisement into a unique context. To efficiently distribute advertisements, an information distribution system may utilize machine learning models tailored to each particular user, but the information available for training such a machine learning model may be sparse.

Users on social media accounts may subscribe to other accounts, commonly referred to as followees. These followees may continuously produce messages, corresponding in general to the follower's long term interest. Once posted, the messages are pushed into the follower's timeline, a continuous stream of messages from one's followees. To facilitate the consumption of the large amount of real time information, each user's timeline is displayed in a way that new arrivals are presented on the top of the screen, replacing the older ones. When a user refreshes their timeline, only a limited number of messages may be pushed to the user's device. This may be described as a session, which may consist of all the messages sent to one user at the same time. Alternative descriptions for the definition of a session are described above.

Given a user's timeline, the session pushed to this user at a particular time, and a set of advertisements, techniques of this disclosure may predict the probability that a particular advertisement will be clicked on if it is displayed on this user's timeline. Traditional online advertising usually appears in two forms: sponsored search and contextual advertising. Sponsored search is designed for web search engines. The sponsored search is concerned with placing advertisements onto a search result page of a particular query. In contrast, contextual advertising studies how to display advertisements on a regular, usually static Web page. Compared with these two traditional paradigms, placing advertisements into a social media user's timeline is particularly challenging given its streamed nature. First, the stream of messages is emitted from accounts the user follows, which usually correspond to their long term interest but do not reflect their current status. However, whether the user clicks on an advertisement or not may depend on their current information need (a.k.a., intent) when the advertisement is viewed. For example, a user following a software company may not necessarily currently be looking for a product from that software company. Conversely, a user who is inquiring about the most recent version of a software product may not necessarily subscribe to the software company's feeds. Second, every user receives a unique stream of messages which update continuously. Compared with sponsored search where an advertisement can be placed whenever the same query is issued, and to contextual advertising where an advertisement can be placed whenever a user visits the same Web page, in a social media message stream, few advertisements are placed in the same session. Moreover, every user has a different timeline which is updated dynamically. This means that there is a unique "page" (e.g., session) for every user at any given time point. As a result, advertisements inserted at different time points are actually displayed in completely different "pages" (sessions). These factors make it difficult to gather enough user behavioral signals for training a machine learning model and non-trivial to utilize historical clicks on an advertisement for predicting how likely it will be clicked on in the future.

The nature of social media platforms encourages various forms of advertisements. For instance, advertisers could invite users to follow their social media accounts, enhance the popularity of a particular hashtag, and distribute product information via messages in the social media platform. Among them, a large proportion of user targeting takes the form of the messages themselves, which may be called promoted messages. When inserted in user's timeline, promoted messages are like regular messages: they scroll through the timeline, appear in the timeline just once, and users can engage with the messages by a variety of forms. For example, users can click on uniform resource locators (URLs), retweet, reply to, like, or favorite the promoted message, just as they do to any other regular messages. The only difference may be that a user could perform a negative engagement with a promoted message by hitting a "dismiss" button associated with the promoted messages. When a social media user refreshes their home timeline, the client side may issue an advertisement display request to the advertisement server (e.g., information distribution platform 112). This time stamp may be a request time. An initial set of advertisement candidates may be formed according to the information of the user. To decide the winner from these candidates, an auction may be run based on two factors. The first is the bid price, or the amount of money advertisers may be willing to pay if users engage with their advertisements. The second factor is the predicted click probability. Determining the predicted click probability is called the click-through rate (CTR) prediction. In this disclosure, clicks may mean any type of engagement with the messages. For the purposes of this disclosure, the prediction may be for the probability of any positive engagements, e.g., retweet, reply, like, favorite, and URL visit. Described methods could be easily generalized to prediction of a specific user action, e.g., dismissing a promoted message. Positive engagements are shortened as engagements hereinafter. At the end of the auction, there could be zero to K winning advertisements. No advertisement will be placed if the system cannot find a good match to the context. Showing advertisements in this case may hurt user experience. For the same reason, the maximum number of selected advertisements K is usually set to a very small number.

There may be two aspects in the CTR prediction task. The first aspect is a correct estimation of click probability, especially for the winners in the auction. An underestimation could result in no winners while an overestimation could incur user frustration. In addition, inaccurate prediction may lead to complications in charging. The second aspect is that a ranking of the advertisements may, in certain cases, be more critical than the actual values of CTR when choosing the best advertisements to show to every user. There may also be a very limited number of spots to display advertisements. A model achieving reasonable CTR estimation does not necessarily output good ranking, and vice versa.

Having chosen the advertisements to display, the server may receive an impression callback from the client, indicating the successful appearance of advertisements in the user's device screen. This time stamp is recorded as an impression callback time. This callback is helpful given the streamed nature of user's timeline: promoted messages might have already been scrolled over before users ever see it. If, by any chance, the user engages with the promoted message, an engagement callback will be triggered. This point of time is called the engagement callback time.

Following the typical machine learning approach to CTR prediction, a point-wise learning-to-rank approach may be used as a baseline. In particular, information distribution system 112 may train a probabilistic classifier that assigns a posterior click-through probability to an advertisement, if it is displayed in user's current session of their timeline. The training data may be made up of all historical impressions shown across all users. These data are treated as i.i.d. and the learning algorithm may optimize, or otherwise be improved, for the global loss. An instance is represented as (y, x), where $y \in \{\pm 1\}$ is the ground-truth binary label, with value 1 being the presence of clicks. Feature vector x may be extracted from the advertisement, user, timeline, current session, and possible interactions between any two of the entities. These features should be general because no session repeats. In certain examples, D={(y, x)} be the set of all instances. The loss function for the point-wise learning can be formulated as $$L(w, D) = \sum_{(y,x) \in D} l(y, f(w, x))$$

where $f$ is a hypothesis function, w is function parameters, and l is a loss function for a single instance. In order to quickly capture a user's change of information need, and enable large-scale online learning on the huge amount of click data, logistic regression may be utilized to instantiate this learning framework with stochastic gradient descent (SGD) as the algorithm. Specifically, the function may include $$l(y, f(w,x)) = \log(1 + \exp(-yf(w,x)))$$

where $f(w, x) = w^T x$, and $y \in \{\pm 1\}$.

In point-wise approaches, the learner (e.g., point-wise learning model 116) takes as input a single instance (e.g., candidate advertisement 136) one at a time, with presence of engagement as the target value. Despite its advantage of directly minimizing prediction error, point-wise learning does not take into account the relative order of advertisements in terms of a particular user's preference, externalized by this user's click probability on each advertisement. However, ranking is critical in the auction of determining the winning advertisements—only a top few candidates can be finally displayed.

It is natural that user's interest on advertisements can change over time. If a user clicked an advertisement $a_A$ one year ago, and ignored an advertisement $a_B$ today, it is doubtful to draw the conclusion that this user prefers $a_A$ to $a_B$, due to a possible shift of interest of this user over a year. However, it is reasonable to assume that user preference is steady during a short time period. For example, two advertisements are more comparable if they are presented to the same user in one session. Two advertisements in the same session have almost the exact same context, thus directly optimizing, or otherwise improving, the preference order between them.

In order to optimize for, or otherwise improve for, the relative user preference, a pair-wise learning approach may be utilized, which may incur less ranking loss. In other words, predicting the selection probability of a single candidate advertisement may, in certain cases, not provide the truest ranking of how a user may feel regarding a group of candidate advertisements. As such, comparing pairs of advertisements and adjusting the overall rankings accordingly may, in some cases, provide a truer set of rankings and probabilities. In particular, information distribution system 112 may train a pair-wise model (e.g., pair-wise learning model 118) on advertisement pairs that are shown to one user in the same session. Let $P=\{((y_A, x_A), (y_B, x_B)) | y_A \neq y_B\}$ be the set of all pairs. The loss function is defined as $$L(w, P) = \sum_{((yA,xA),(yB,xB)) \in P} l(g(yA - yB), f(w, xA) - f(w, xB))$$

where $g(y_A-y_B)$ transforms the difference of two individual instance labels into the label for pair-wise learning. $g(y)=y/2$ to ensure that $g(y_A-y_B) \in \{\pm 1\}$. For logistic regression, $f(w, xA)-f(w, xB)=w^T x_A - w^T x_B = w^T(x_A-x_B)=f(w, x_A-x_B)$. Therefore, the logistic loss listed in classification section can still be used with no change, bringing the advantage that pair-wise learning can be conducted in an online and scalable manner, just as point-wise learning.

As stated above, pair-wise approaches may minimize ranking loss. Accordingly, the output of pair-wise model is interpreted as preference score, rather than predicted click probability. However, estimation of click probability is useful for advertisement auctions. This means calibration may transform score to click probability. A common practice is to use a sigmoid function, where the coefficients are learned through maximizing likelihood on the training set. An advantage of this transformation is that the relative order of instances ranked by score of the original model may be preserved.

Point-wise approaches try to obtain good estimate of click probability, while pair-wise approaches aim to learn the ranking of impressions ordered by click probability. This brings their respective downside: point-wise methods may perform poorly on ranking, whereas pair-wise methods tend to have the problem of inaccurate CTR estimation. Another practical problem could possibly arise using solely pair-wise learning: not all sessions have more than one advertisement. Consequently, a large proportion of instances may be wasted at the training stage. Therefore, techniques of this disclosure describe an online algorithm, based on a combined framework:

$$\min \alpha L(w,D) + (1-\alpha)L(w,P)$$

with a being a trade-off parameter between optimizing, or otherwise improving, towards classification and ranking. This trade-off may be implemented by sampling an instance from D with probability a and a pair from P with probability $1-\alpha$. The sampling practice may be used for offline static learning. For real online learning, the model receives training data in the form of advertisement stream, and advertisements of one session could return at different time points. Therefore, an algorithm adapted to the online setting may be developed for the combined learning.

In practice, multiple advertisements shown in the same user session may still be the minority case, because of the need to protect user experience by controlling the advertisements load. This is especially true for promoted messages, which are inserted into the main stream that users consume information from, unlike search advertisements or contextual advertisements displayed on the sidebar. As a result, only a small percentage of training instances fed to the model may be from a pair of advertisements. Consequently, the learned model may be biased towards minimizing classification loss, failing to obtain enough pairs to induce a good ranker and mitigate the sparsity issue. To combat this problem, one strategy may be to form more pairs artificially by grouping impressions from distinct requests. There may be two grouping choices: across different users and within one user. Comparing impressions across users may be to compare clicks collected from disparate preferences. It is possible to pair impressions from users sharing similar interests, similar to collaborative filtering.

For a single user, a user's interest shifts over the course of time, it is reasonable to assume that each user's preference is stable within a short period of time. This makes it plausible to form "pseudo-pairs" by grouping impressions shown in different sessions but to the same user. To emphasize the time information, importance weight may be attached to formed pairs based on time difference. Mathematically, let $S=\{((y_A, x_A, t_A), (y_B, x_B, t_B)) | y_A \neq y_B, t_A \neq t_B\}$ be the set of all pseudo-pairs, where $t_A$, $t_B$ are the request time of impression A and B respectively. The loss function is defined as $$L(w, S) = \sum_{((yA,xA,tA),(yB,xB,tB)) \in S} \max\left(\min\left(\log \frac{N}{|tA - tB|}, 1\right), 0\right) *$$

$$l(g(yA - yB), f(w, xA) - f(w, xB))$$

where N is acting as the size of a sliding window—the weight of a paired instance is 0 if $|t_A-t_B| \geq N$. The framework incorporating pseudo-pairs can be formulated as:

$$\min \alpha_1 L(w,D) + \alpha_2 L(w,P) + (1-\alpha_1-\alpha_2)L(w,S)$$

Considering the massive behavior data collected from each user's timeline, models that could be updated online may be useful. Point-wise and combined learning could be conducted in an online manner, so that large-scale online A/B tests can be performed.

Online learning may utilize obtained new clicks and non-clicks in real-time so that new training instances could be formed to update the model. However, some difficulties surface due to the nature of stream.

The first issue is related to deciding whether users have seen the promoted messages. Since it is possible that users do not click advertisements simply because they fail to see it, only advertisements with impression callbacks may be considered as training examples.

The second issue is the length of time varies for different users to finally see and engage with the promoted messages. This leads to a time difference for servers to receive engagement callbacks. The worst case is that users simply ignore these messages and servers can never obtain engagement callbacks. Hence comes the problem of deciding the length of time the server should wait for user clicks. Because a training instance is not complete until its label is decided, this waiting time directly determines the lag of online learning. One solution to this problem is to cache impressions, and judge them as negative if no engagement callbacks are returned in a predefined amount of time. For example, the judgment of labels could be wrong—engagement callbacks could return after the predefined time. The longer the advertisements are cached, the more likely it is to obtain the ground-truth labels. However, trade-off exists—longer cache time can lead to larger cache size and longer delays in training. In accordance with techniques of this disclosure, impressions may be set as negative and are added to the training set immediately when impression callback is received. If ever engagement callback returns, this impression is reset as positive to update the model again. This solution saves the large amount of cache space and ensures no delay of training. Additionally, considering the rarity of clicking events, only a small percentage of examples need correction.

Combined learning may use training instances formed from both a single advertisement and a pair of advertisements. The procedure of obtaining single advertisements is identical to the one for point-wise learning. However, two problems remain to be solved. First, the collection of a pair of advertisements with click information may be difficult. Second, there exists a trade-off between classification and ranking. That is, how to combine point-wise learning and pair-wise learning.

The label for a pair may be decided only if the server obtains click labels for both impressions in the pair. However, engagement callbacks return separately and the time at which the engagement callbacks return varies greatly. To wait for the labels for both impressions, the returns may be cached. The cache may be accessed by using request id as the key. The cache value is a set of impressions with labels initialized to null. Each cache entry may be alive for a predetermined amount of time, such as 15 minutes. When an impression callback arrives, the label of the correspondent impression may be set to negative. Whereas when an engagement callback returns, the label for the associated impression may be turned to positive. Updating of the model is only necessary when one impression label changes from negative to positive, namely the moment when an engagement callback occurs. The positive instance may then be paired with all negative instances belonging to one session.

With regard to the second problem, a simple strategy may apply point-wise learning for each individual impression, and do both point-wise and pair-wise learning when there is more than one impression with differing labels. In this example, the trade-off parameter a depends on the percentage of requests with a single advertisement and the number of clicked advertisements in requests with more than one advertisement.

A first example algorithm for updating the combine point-wise and pair-wise learning models is shown below:
Input: cache, request ID req_id, call back impression ID imp_id, call back type type, current model parameter w, weight $w_p$ for paired instance
Output: Updated model parameter w

```
1:    imp_map ← cache.get(req_id)
2:    (y, x) ← imp_map.get(imp_id) // get impression
3:    if type = impression call_back then
4:        imp_map.set(imp_id; (−1, x)) // set label to negative
5:        update w using (−1, x) by SGD // point-wise learning
6:    else // handle engagement call back
7:        imp_map:set(imp_id; (+1, x)) // set label to positive
8:        update w using (+1, x) by SGD // point-wise learning
9:        P ← extract pairs (imp_map, (+1, x))
10:       if P.length > 0 then // pair-wise learning
11:           for Each pair ((y_A, x_A), (y_B, x_B)) in P do
12:               x ← (x_A − x_B)
13:               y ← g(y_A − y_B)
14:               update w using (y, x) and weight $w_p$ by SGD
15:           end for
16:       end if
17:   end if
```

A second example algorithm for updating the combine point-wise and pair-wise learning models is shown below, where pairs are extracted for a particular request:
Input: Impression map imp_map, call back impression (y, x)
Output: An array of paired instances P={((y_A, x_A) (y_B, x_B))|y_A≠y_B}

```
1:    P ← { }
2:    for Each negative instance (y⁻, x⁻) in imp_map do
3:        Draw z uniformly at random from [0, 1)
4:        if z < 0.5 then
5:            Form a pair p ← ((y, x), (y⁻, x⁻))
6:        else
7:            Form a pair p ← ((y⁻, x⁻), (y, x))
8:        end if
9:        P ← P ∪ {p}
10:   end for
```

Figure 3:
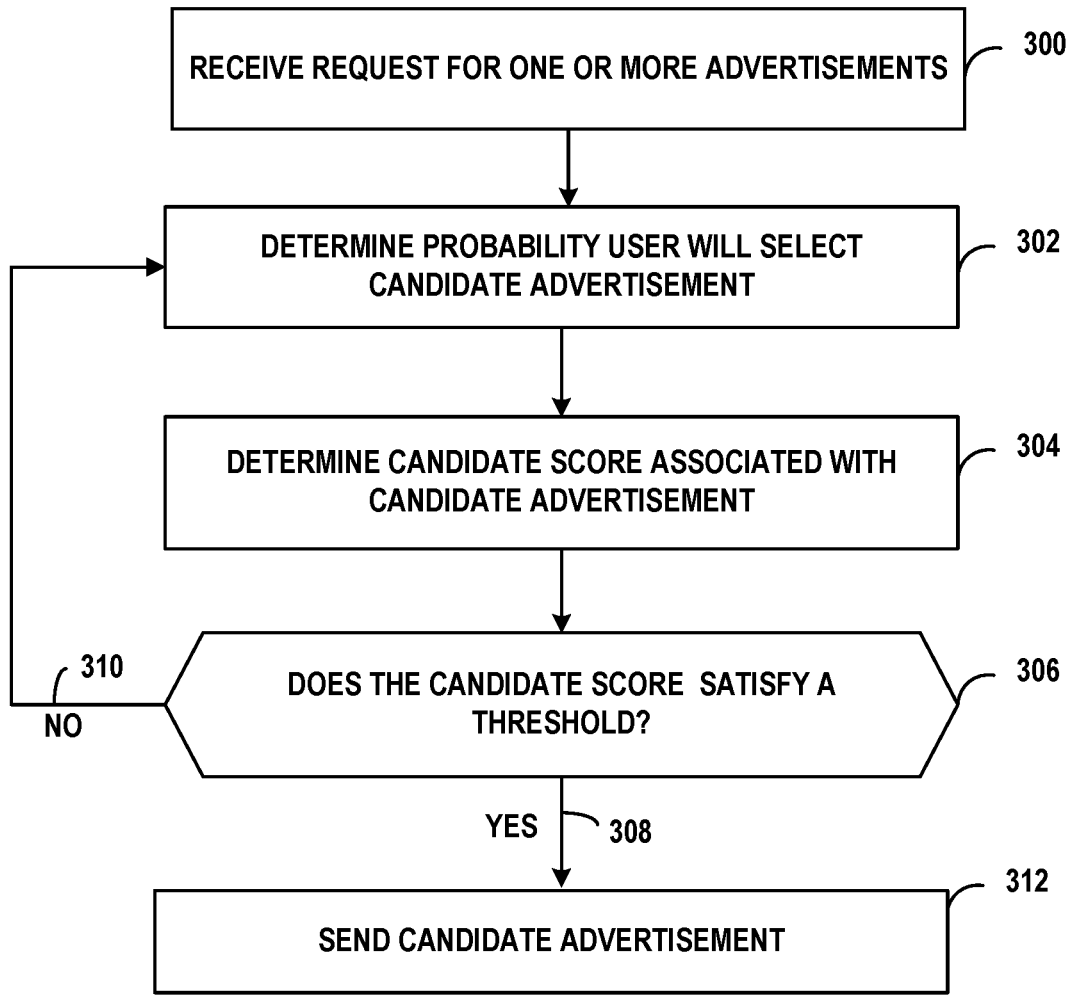
FIG. 3 is a flow diagram illustrating example operations of a computing device that implements techniques for selecting candidate advertisements for display on a client device based on a point-wise learning model and a pair-wise learning model, in accordance with one or more aspects of the present disclosure.

FIG. 3 is a flow diagram illustrating example operations of a computing device that implements techniques for selecting candidate advertisements for display on a client device based on a point-wise learning model and a pair-wise learning model, in accordance with one or more aspects of the present disclosure. For purposes of illustration only, the example operations are described below within the context of information distribution system 112, as shown in FIGS. 1 and 2.

In accordance with techniques of this disclosure, information distribution system 112 may receive, from client device 102A of a user, a request for one or more advertisements from a set of advertisements to display at client device 102A with a set of messages (e.g., cards 132A and 132B) (300). The set of messages may be associated with the user in a social network messaging service. For instance, while the user is scrolling through the messages in the social network messaging service, client device 102A may automatically send a request to information distribution system 112 for information distribution system 112 to send an advertisement which client device 102A may display at graphical user interface 130.

Content provider system 124 may provide the set of advertisements to information distribution system in targeted content 122, which may be a subset or the entire set of advertisements in targeted content 126. Targeted content 126 may be a database of advertisements that may be displayed by client device 102A. Targeted content 122 may be a subset of targeted content 126 based on the social media platform currently in use by client device 102A, the demographic information of a user of client device 102A, or any other function that limits the amount of possible advertisements sent to information distribution system 112.

Using a machine learning model that is based at least in part on point-wise learning model 116 and pair-wise learning model 118, distribution module 114 may determine a probability that the user will select a candidate advertisement from the set of advertisements included in targeted content 122 (302). For instance, distribution module 114 may select a first candidate advertisement from targeted content 122. Using the data included in point-wise learning model 116, distribution module 114 may determine an initial probability or ranking for the candidate advertisement. Using the data included in pair-wise learning model 118, distribution module 114 may adjust the initial probability or ranking based on how the candidate advertisement may rank against other candidate advertisements present in the set of advertisements included in targeted content 122. For example, the first candidate advertisement may initially have the third-highest probability of being selected based on point-wise learning model 116. However, using pair-wise learning model 118, distribution module 114 may determine that the first candidate advertisement is likely to be selected over the candidate advertisements with the first- and second-highest probabilities if the first candidate advertisement was shown in the same session as these candidate advertisements. As such, distribution module 114 may adjust the probability that the user would select the first candidate advertisement by increasing the probability as indicated by point-wise learning model 116 alone.

Distribution module 114 may determine, based at least in part on the probability that the user will select the candidate advertisement, a candidate score associated with the candidate advertisement (304). In some examples, the candidate score may be the determined probability itself. In other examples, distribution module 114 may determine the score as a ranking value of the probabilities when compared to other advertisements in the set of advertisement. In other examples, the score may be a combination of the two systems above or any other scoring system that may assign a score to a candidate advertisement based on the probability that the user will select the candidate advertisement.

Distribution module 114 may determine whether the candidate score satisfies a threshold score (306). For instance, in certain non-limiting examples, distribution module 114 may not send any advertisement to client device 102A if the probability that the user will select the advertisement is below 20%. In other instances, distribution module 114 may not send any advertisement to client device 102A if the advertisement ranks outside of the top-five most likely advertisements that a user may select. It should be noted that the thresholds of 20% and the top-five ranks are given only as example illustrations. The threshold may be any percentage, rank, or other score format deemed reasonable by information distribution system 112 or client device 102A. By comparing the determined score to a threshold score, distribution module 114 may reduce network traffic for information sent over network 128. This may enable a higher level of efficiency and reduced battery consumption in both information distribution system 112 and client device 102A.

If the candidate score for the candidate advertisement does not satisfy the threshold ("NO" branch 310), distribution module 114 may repeat step 302 for a second candidate advertisement. If the candidate score for the candidate advertisement satisfies the threshold score ("YES" branch 308), distribution module 114 may send the candidate advertisement for display at client device 102A with the set of messages (312). For instance, distribution module 114 may send collocated content 110 to client device 102A. Collocated content 110 may include the set of messages, such as user content 134 to be shown in card 132B in graphical user interface 130. Collocated content 110 may also include candidate advertisement 136, which has a candidate score that satisfies the threshold score, to be displayed in card 132C in graphical user interface 130 along with card 132B.

Figure 4:
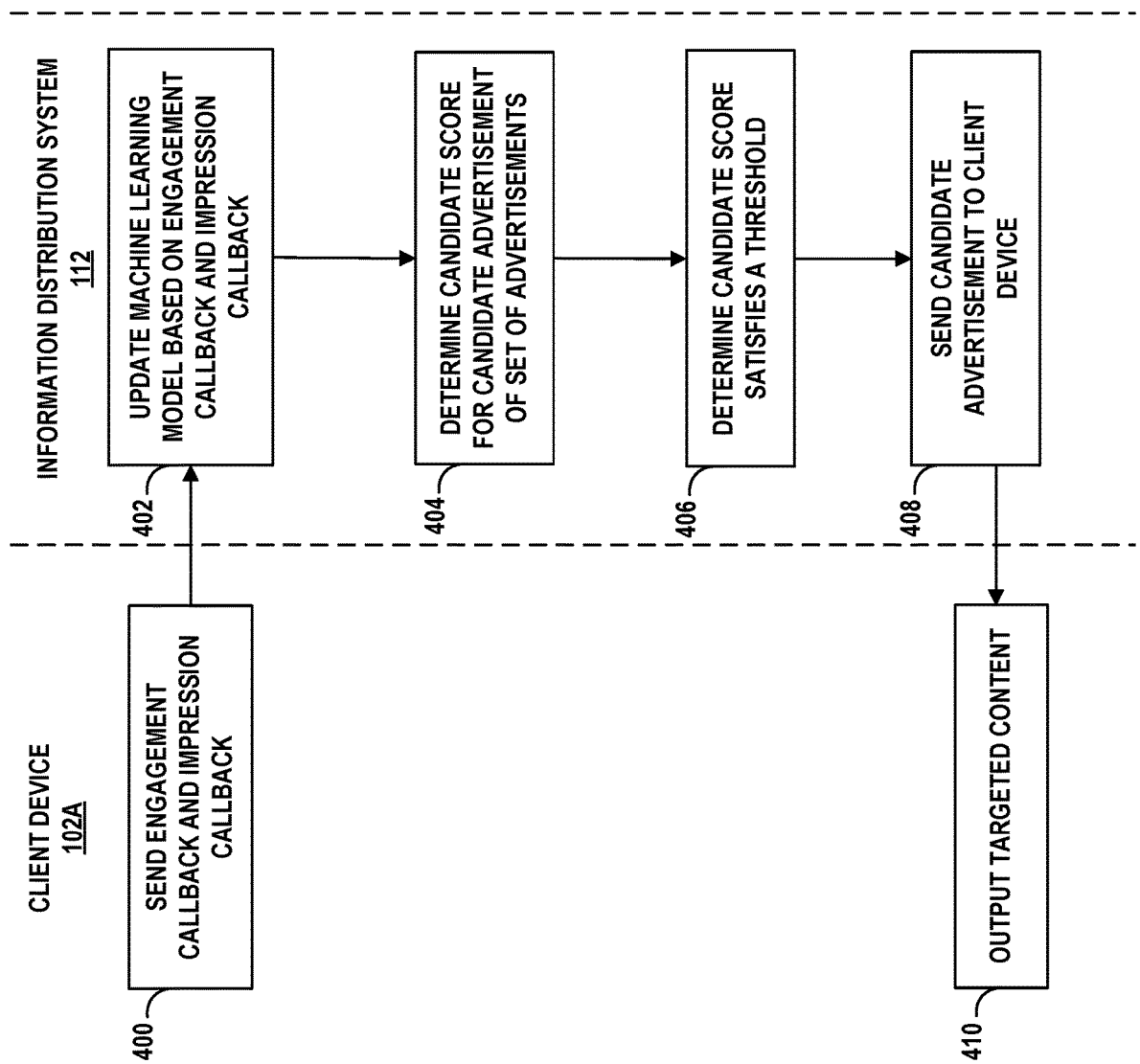
FIG. 4 is a flow diagram illustrating example operations of an information distribution system and a client device, in accordance with one or more aspects of the present disclosure.

FIG. 4 is a flow diagram illustrating example operations of an information distribution system and a client device, in accordance with one or more aspects of the present disclosure. For purposes of illustration only, the example operations are described below within the context of information distribution system 112, as shown in FIGS. 1 and 2.

Client device 102A may send an impression callback and an engagement callback to information distribution system 112 (400). For instance, machine learning module 220 may receive an impression callback time 232 that indicates a time stamp when the candidate advertisement from the set of candidate advertisements was displayed at the client device. If the advertisement was selected, machine learning module 220 may further receive an engagement callback time 234 that indicates a time stamp when the candidate advertisement from the set of candidate advertisements was selected by the user at the client device. In such instances, machine learning module 220 may train the machine learning model (e.g., update models 116 and 118) based at least in part impression callback time 232 and engagement callback time 234. Machine learning module 220 may update models 116 and 118 based on "callbacks," or particular timestamps (402).

For instance, the difference between impression callback time 232 and engagement callback time 234 may influence the extent to which models 116 and 118 are updated. Specifically, the extent to which the scores in models 116 and 118 are updated may be inversely proportional to the difference between impression callback time 232 and engagement callback time 234. For example, if there is a small difference between impression callback time 232 and engagement callback time 234, the user may have been immediately drawn to the candidate advertisement and especially interested in the content of the candidate advertisement or the product being marketed in the candidate advertisement. As such, if the user was presented with a similar advertisement or the same candidate advertisement in the future, machine learning module 220 may use the quick selection as evidence of the user being highly interested in this type of advertisement. Therefore, machine learning module 220 may potentially greatly increase the corresponding scores in point-wise learning model 116 and/or pair-wise learning model 118 more to reflect the speed at which the user selected the candidate advertisement.

Conversely, if there is a larger difference between impression callback time 232 and engagement callback time 234, the user may have not been drawn to the candidate advertisement right away or the user may have evaluated the candidate advertisement with a hesitation as to whether the candidate advertisement was worthy of exploring deeper. As such, if presented with a similar advertisement or the same candidate advertisement in the future, machine learning module 220 may use the hesitation as evidence of the user being only slightly or moderately interested in this type of advertisement. Therefore, machine learning module 220 may only slightly increase the corresponding scores in point-wise learning model 116 and/or pair-wise learning model 118 more to reflect the slower speed at which the user selected the candidate advertisement.

Machine learning module 220 may receive the training instances from the specific user and update user-specific point-wise learning models and pair-wise learning models. In other instances, point-wise learning model 116 and pair-wise learning models may be used for multiple users with similar demographic information or interests. In such instances, machine learning module 220 may receive a continuous stream of training instances from a plurality of client devices, with each training instance indicating at least one of an impression callback or an engagement callback associated with the candidate advertisement that is displayed at each of the plurality of client devices. Machine learning module may then train models 116 and 118 based at least in part on the continuous stream of training instances that correspond to the candidate advertisement.

For example, for users that have an interest in automobiles, a single point-wise learning model and pair-wise learning model may be utilized for all users with that interest. In this example, machine learning module 220 may update the point-wise learning model and pair-wise learning model for a candidate advertisement displayed to a group of these users, as machine learning module 220 may assume that each user with this similar interest may have a similar reaction to the same advertisement. Conversely, a user who has an interest in automobiles may have different advertisement selection behavior than a user who has an interest in knitting. As such, users who have an interest in knitting may have a different point-wise learning model and pair-wise learning model than the users who have an interest in automobiles. The point-wise learning models and pair-wise learning models may be further customized based on a user's combination of interests. Machine learning module 220 may determine the user's interests based on accounts that the user subscribes to in the social media application.

Using the updated machine learning model that is based at least in part on point-wise learning model 116 and pair-wise learning model 118, distribution module 114 may determine a probability that the user will select a candidate advertisement from the set of advertisements included in targeted content 230 (404). For instance, distribution module 114 may select a first candidate advertisement from targeted content 230. Using the data included in point-wise learning model 116, distribution module 114 may determine an initial probability or ranking for the candidate advertisement. Using the data included in pair-wise learning model 118, distribution module 114 may adjust the initial probability or ranking based on how the candidate advertisement may rank against other candidate advertisements present in the set of advertisements included in targeted content 230. For example, the first candidate advertisement may initially have the highest probability of being selected based on point-wise learning model 116. However, using pair-wise learning model 118, distribution module 114 may determine that the first candidate advertisement is less likely to be selected over the candidate advertisements with the second- and third-highest probabilities if the first candidate advertisement was shown in the same session as these candidate advertisements. As such, distribution module 114 may adjust the probability that the user would select the first candidate advertisement by decreasing the probability as indicated by point-wise learning model 116 alone.

Distribution module 114 may determine, based at least in part on the probability that the user will select the candidate advertisement, a candidate score associated with the candidate advertisement (406). In some examples, the candidate score may be the determined probability itself. In other examples, distribution module 114 may determine the score as a ranking value of the probabilities when compared to other advertisements in the set of advertisement. In other examples, the score may be a combination of the two systems above or any other scoring system that may assign a score to a candidate advertisement based on the probability that the user will select the candidate advertisement.

In some examples, the determined score may further be based on a bid price that an advertiser will pay if the user selects the candidate advertisement. In such examples, the determined score may be an expected profit for an operator of information distribution system 112 if distribution module 114 sends the candidate advertisement for display at the client device. For instance, distribution module 114 may determine that the probability that the user will select a given candidate advertisement is 25%. Distribution module 114 may also determine that the advertiser will pay the operator of information distribution system 112 ten dollars if the user selects the candidate advertisement. As such, using this information, distribution module 114 may determine that the expected profit for the operator if distribution module 114 sent the candidate advertisement to the client device for display is two dollars and fifty cents.

Distribution module 114 may determine that the candidate score satisfies a threshold score (406). For instance, in certain non-limiting examples, distribution module 114 may not send any advertisement to client device 102A if the expected profit from the user selecting the advertisement (e.g., the probability the user selects the advertisement multiplied by the amount the advertiser will pay the operator of information distribution system 112 if the user selects the advertisement) is below two dollars. In other instances, distribution module 114 may not send any advertisement to the client device if the advertisement ranks outside of the top-five expected profits. It should be noted that the thresholds of two dollars and the top-five ranks are given only as example illustrations. The threshold may be any percentage, rank, expected profit, or other score format deemed reasonable by information distribution system 112 or the client device. By comparing the determined score to a threshold score, distribution module 114 may reduce network traffic for information sent over the network. This may enable a higher level of efficiency and reduced battery consumption in both information distribution system 112 and the client device.

If the candidate score for the candidate advertisement satisfies the threshold score, distribution module 114 may send the candidate advertisement for display at the client device with the set of messages (408). For instance, distribution module 114 may send collocated content to the client device that includes the set of messages, such as user content to be shown in a card in the graphical user interface. Collocated content 110 may also include the candidate advertisement from targeted content 230, which has a candidate score that satisfies the threshold score, to be displayed in a card in the graphical user interface along with a card that shows user content from the set of messages. Client device 102A may then output the targeted content, or the received candidate advertisement (410).

In some examples, distribution module 114 may send the candidate advertisement in a set of candidate advertisements, where each respective candidate advertisement in the set of candidate advertisements has a respective candidate score that satisfies the threshold score. The client device may then select one of the candidate advertisements from the set of candidate advertisements to display with the set of messages.

Example 1

A method comprising: receiving, by a computing device and from a client device of a user, a request for one or more advertisements from a set of advertisements to display at the client device with a set of messages, wherein the set of messages is associated with the user in a social network messaging service; determining, by the computing device, using a machine learning model that is based at least in part on a point-wise learning model and a pair-wise learning model, a probability that the user will select a candidate advertisement from the set of advertisements; determining, by the computing device, based at least in part on the probability that the user will select the candidate advertisement, a candidate score associated with the candidate advertisement; determining, by the computing device, that the candidate score satisfies a threshold score; and sending, by the computing device and for display at the client device with the set of messages, the candidate advertisement.

Example 2

The method of example 1, wherein determining the probability that the user will select the candidate advertisement further comprises: training, by the computing device, the machine learning model based on training instances for single advertisements and training instances for pairs of advertisements; and generating, by the computing device and based at least in part on the machine learning model, the candidate score for the candidate advertisement.

Example 3

The method of example 2, further comprising: receiving, by the computing device and from the client device, an impression callback time that indicates a time stamp when the candidate advertisement from the set of candidate advertisements was displayed at the client device; and receiving, by the computing device and from the client device, an engagement callback time that indicates a time stamp when the candidate advertisement from the set of candidate advertisements was selected by the user at the client device, wherein training the machine learning model comprises training the machine learning model based at least in part on the impression callback time and the engagement callback time.

Example 4

The method of example 2, further comprising: receiving, by the computing device and from a plurality of client devices, a continuous stream of training instances that correspond to the candidate advertisement displayed at the plurality of client devices, wherein each training instance indicates at least one of an impression callback or an engagement callback associated with the candidate advertisement of the set of candidate advertisements; and wherein training the machine learning model comprises training the machine learning model based at least in part on the continuous stream of training instances that correspond to the candidate advertisement.

Example 5

The method of any of examples 1-4, wherein determining the candidate score comprises: determining, by the computing device and based at least in part on the probability that the user will select the candidate advertisement and on a bid price that an advertiser will pay if the user selects the candidate advertisement, the candidate score for the candidate advertisement.

Example 6

The method of any of examples 1-5, wherein sending the candidate advertisement comprises: sending, by the computing device, the candidate advertisement in a set of candidate advertisements, wherein each respective candidate advertisement in the set of candidate advertisements has a respective candidate score that satisfies the threshold score.

Example 7

A computing device comprising: at least one processor; and at least one non-transitory computer-readable storage medium storing instructions that are executable by the at least one processor to: receive, from a client device of a user, a request for one or more advertisements from a set of advertisements to display at the client device with a set of messages, wherein the set of messages is associated with the user in a social network messaging service; determine, using a machine learning model that is based at least in part on a point-wise learning model and a pair-wise learning model, a probability that the user will select a candidate advertisement from the set of advertisements; determine, based at least in part on the probability that the user will select the candidate advertisement, a candidate score associated with the candidate advertisement; determine that the candidate score satisfies a threshold score; and send, for display at the client device with the set of messages, the candidate advertisement.

Example 8

The computing device of example 7, wherein the instructions that are executable by the at least one processor to determine the probability that the user will select the advertisement comprise instructions that are executable by the at least one processor to: train the machine learning model based on training instances for single advertisements and training instances for pairs of advertisements; and generate, based at least in part on the machine learning model, the candidate score for the candidate advertisement.

Example 9

The computing device of example 8, wherein the instructions are further executable by the at least one processor to: receive, from the client device, an impression callback time that indicates a time stamp when the candidate advertisement was displayed at the client device; and receive, from the client device, an engagement callback time that indicates a time stamp when the candidate advertisement was selected by the user at the client device, wherein the at least one module being operable by the at least one processor to train the machine learning model comprises the at least one module being operable by the at least one processor to train the machine learning model based at least in part on the impression callback time and the engagement callback time.

Example 10

The computing device of example 8, wherein the instructions are further executable by the at least one processor to: receive, from a plurality of client devices, a continuous stream of training instances that correspond to the candidate advertisement displayed at the plurality of client devices, wherein each training instance indicates at least one of an impression callback or an engagement callback associated with the candidate advertisement of the set of candidate advertisements; and wherein the at least one module being operable by the at least one processor to train the machine learning model comprises the at least one module being operable by the at least one processor to train the machine learning model based at least in part on the continuous stream of training instances that correspond to the candidate advertisement.

Example 11

The computing device of any of examples 7-10, wherein the instructions that are executable by the at least one processor to determine the candidate score comprise instructions that are executable by the at least one processor to: determine, based at least in part on the probability that the user will select the candidate advertisement and a bid price that an advertiser will pay if the user selects the candidate advertisement, the candidate score for the candidate advertisement.

Example 12

The computing device of any of examples 7-11, wherein the instructions that are executable by the at least one processor to send the candidate advertisement comprise instructions that are executable by the at least one processor to: send the candidate advertisement in a set of candidate advertisement, wherein each respective candidate advertisement in the set of candidate advertisement has a respective candidate score that satisfies the threshold score.

Example 13

A non-transitory computer-readable storage medium encoded with instructions that, when executed, cause at least one processor of a computing device to: receive, from a client device of a user, a request for one or more advertisements from a set of advertisements to display at the client device with a set of messages, wherein the set of messages is associated with the user in a social network messaging service; determine, using a machine learning model that is based at least in part on a point-wise learning model and a pair-wise learning model, a probability that the user will select a candidate advertisement from the set of advertisements; determine, based at least in part on the probability that the user will select the candidate advertisement, a candidate score associated with the candidate advertisement; determine that the candidate score satisfies a threshold score; and send, for display at the client device with the set of messages, the candidate advertisement.

Example 14

The non-transitory computer-readable storage medium of example 13, wherein the instructions that cause the at least one processor to determine the probability that the user will select the advertisement comprise instructions that, when executed, cause the at least one processor to: train the machine learning model based on training instances for single advertisements and training instances for pairs of advertisements; and generate, based at least in part on the machine learning model, the candidate score for the candidate advertisement.

Example 15

The non-transitory computer-readable storage medium of example 14, further comprising instructions that, when executed, cause the at least one processor to: receive, from the client device, an impression callback time that indicates a time stamp when the candidate advertisement was displayed at the client device; and receive, from the client device, an engagement callback time that indicates a time stamp when the candidate advertisement was selected by the user at the client device, wherein the at least one module being operable by the at least one processor to train the machine learning model comprises the at least one module being operable by the at least one processor to train the machine learning model based at least in part on the impression callback time and the engagement callback time.

Example 16

The non-transitory computer-readable storage medium of example 14, further comprising instructions that, when executed, cause the at least one processor to: receive, from a plurality of client devices, a continuous stream of training instances that correspond to the candidate advertisement displayed at the plurality of client devices, wherein each training instance indicates at least one of an impression callback or an engagement callback associated with the candidate advertisement of the set of candidate advertisements; and wherein the at least one module being operable by the at least one processor to train the machine learning model comprises the at least one module being operable by the at least one processor to train the machine learning model based at least in part on the continuous stream of training instances that correspond to the candidate advertisement.

Example 17

The non-transitory computer-readable storage medium of any of examples 13-16, wherein instructions that cause the at least one processor to determine the candidate score comprise instructions that, when executed, cause the at least one processor to: determine, based at least in part on the probability that the user will select the candidate advertisement and a bid price that an advertiser will pay if the user selects the candidate advertisement, the candidate score for the candidate advertisement.

Example 18

The non-transitory computer-readable storage medium of any of examples 13-17, further comprising instructions that, when executed, cause the at least one processor to: send the candidate advertisement in a set of candidate advertisement, wherein each respective candidate advertisement in the set of candidate advertisement has a respective candidate score that satisfies the threshold score.

Example 19

An apparatus comprising: means for receiving, from a client device of a user, a request for one or more advertisements from a set of advertisements to display at the client device with a set of messages, wherein the set of messages is associated with the user in a social network messaging service; means for determining, using a machine learning model that is based at least in part on a point-wise learning model and a pair-wise learning model, a probability that the user will select a candidate advertisement from the set of advertisements; means for determining, based at least in part on the probability that the user will select the candidate advertisement, a candidate score associated with the candidate advertisement; means for determining that the candidate score satisfies a threshold score; and means for sending, for display at the client device with the set of messages, the candidate advertisement.

Example 20

The apparatus of example 19, further comprising means for performing any of the methods of examples 2-6.

Example 21

A device comprising means for performing the method of any combination of examples 1-6.

Example 22

A computer-readable storage medium encoded with instructions that, when executed, cause at least one processor of a computing device to perform the method of any combination of examples 1-6.

Example 23

A device comprising at least one module operable by one or more processors to perform the method of any combination of examples 1-6.

While this application makes reference to advertisements being evaluated for presentation to a user, similar techniques could be used for other forms of messages. For instance, a social media platform may evaluate potential messages from accounts that the user may or may not currently follow on the social media platform and that information distribution system 112 determines the user may be interested in following, such as messages from accounts for celebrities, athletes, or other influential people or companies in fields that may interest the user. The messages that are evaluated may be messages that such accounts have posted in the past, and information distribution system 112 may evaluate the user's potential interest in those messages and those accounts using a point-wise learning model in conjunction with a pair-wise learning model.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples of the disclosure have been described. Any combination of the described systems, operations, or functions is contemplated. These and other examples are within the scope of the following claims.

The invention claimed is:

1. A method of selecting a first candidate message from a set of candidate messages for display at a client device based on a probability, as determined by at least two learning models, that a user of the client device will select the first candidate message, the method comprising:
   receiving, by a computing device and from the client device of the user, a request for one or more candidate messages from the set of candidate messages to display at the client device together with a set of messages associated with the user in a social network messaging service;
   calculating, by the computing device, using a machine learning model that is based on a point-wise learning model and a pair-wise learning model, a candidate score associated with the probability that the user will select the first candidate message from the set of candidate messages, wherein:
      the point-wise learning model calculates a corresponding first candidate score for each candidate message of the set of candidate messages based on a first likelihood that the user of the client device will select that candidate message, and generates a ranking of the set of candidate messages based on the corresponding first candidate score for each candidate message;
      the pair-wise learning model adjusts the first candidate score of at least one candidate message of the set of candidate messages based on a second likelihood that the user will select the at least one candidate message instead of another candidate message of the set of candidate messages, and reorders the ranking of the set of candidate messages based on the adjusted first candidate score of the at least one candidate message; and
      the candidate score for the first candidate message is based on the reordered ranking of the set of candidate messages;
   determining, by the computing device, that the candidate score satisfies a threshold score;
   sending, by the computing device and for display at the client device, the first candidate message;
   receiving, by the computing device and from the client device, an impression callback time that indicates a time when the first candidate message was displayed at the client device;
   receiving, by the computing device and from the client device, an engagement callback time that indicates a time when the user selected the first candidate message at the client device; and
   training, by the computing device, the machine learning model based at least in part on a difference between the impression callback time and the engagement callback time.

2. The method of claim 1, wherein training the machine learning model further comprises:
   training, by the computing device, the machine learning model based on training instances for single candidate messages and training instances for pairs of candidate messages.

3. The method of claim 2, further comprising:
   receiving, by the computing device and from a plurality of client devices, a continuous stream of training instances that correspond to the candidate message displayed at the plurality of client devices, wherein each training instance indicates at least one of the impression callback or the engagement callback associated with the candidate message of the set of candidate messages; and
   wherein training the machine learning model comprises training the machine learning model based at least in part on the continuous stream of training instances that correspond to the candidate message.

4. The method of claim 1, wherein determining the candidate score comprises:
   determining, by the computing device and based at least in part on the probability that the user will select the candidate message and on a bid price that an advertiser will pay if the user selects the candidate message, the candidate score for the candidate message.

5. The method of claim 1, wherein sending the candidate message comprises:
   sending, by the computing device, the candidate message in a set of candidate messages, wherein each respective candidate message in the set of candidate messages has a respective candidate score that satisfies the threshold score.

6. A computing device for selecting a first candidate message from a set of candidate messages for display at a client device based on a probability, as determined by at least two learning models, that a user of the client device will select the first candidate message, the computing device comprising:
   at least one processor; and
   at least one non-transitory computer-readable storage medium storing instructions that are executable by the at least one processor to:
      receive, from the client device of the user, a request for one or more candidate messages from the set of candidate messages to display at the client device together with a set of messages, wherein the set of messages is associated with the user in a social network messaging service;
      calculate, using a machine learning model that is based on a point-wise learning model and a pair-wise learning model, a candidate score associated with the probability that the user will select the first candidate message from the set of candidate messages, wherein:
         the point-wise learning model calculates a corresponding first candidate score for each candidate message of the set of candidate messages based on a first likelihood that the user of the client device will select that candidate message, and generates a ranking of the set of candidate messages based on the corresponding first candidate score for each candidate message;
         the pair-wise learning model adjusts the first candidate score of at least one candidate message of the set of candidate messages based on a second likelihood that the user will select the at least one candidate message instead of another candidate message of the set of candidate messages, and reorders the ranking of the set of candidate messages based on the adjusted first candidate score of the at least one candidate message; and
         the candidate score for the first candidate message is based on the reordered ranking of the set of candidate messages;
      determine that the candidate score satisfies a threshold score;
      send, for display at the client device, the first candidate message;

receive, from the client device, an impression callback time that indicates a time when the first candidate message was displayed at the client device;

receive, from the client device, an engagement callback time that indicates a time when the user selected the first candidate message at the client device; and train the machine learning model based at least in part on a difference between the impression callback time and the engagement callback time.

7. The computing device of claim 6, wherein the instructions that are executable by the at least one processor to train the machine learning model comprise instructions that are executable by the at least one processor to:

train the machine learning model based on training instances for single candidate messages and training instances for pairs of candidate messages.

8. The computing device of claim 7, wherein the instructions are further executable by the at least one processor to:

receive, from a plurality of client devices, a continuous stream of training instances that correspond to the candidate message displayed at the plurality of client devices, wherein each training instance indicates at least one of the impression callback or the engagement callback associated with the candidate message of the set of candidate messages; and wherein the instructions that are executable by the at least one processor to train the machine learning model comprises the instructions being executable by the at least one processor to train the machine learning model based at least in part on the continuous stream of training instances that correspond to the candidate message.

9. The computing device of claim 6, wherein the instructions that are executable by the at least one processor to determine the candidate score comprise instructions that are executable by the at least one processor to instructions that are executable by the at least one processor to:

determine, based at least in part on the probability that the user will select the candidate message and a bid price that an advertiser will pay if the user selects the candidate message, the candidate score for the candidate message.

10. The computing device of claim 6, wherein the instructions that are executable by the at least one processor to send the candidate message comprise instructions that are executable by the at least one processor to:

send the candidate message in a set of candidate messages, wherein each respective candidate message in the set of candidate messages has a respective candidate score that satisfies the threshold score.

11. A non-transitory computer-readable storage medium for selecting a first candidate message from a set of candidate messages for display at a client device based on a probability, as determined by at least two learning models, that a user of the client device will select the first candidate message, the non-transitory computer-readable storage medium encoded with instructions that, when executed, cause at least one processor of a computing device to:

receive, from the client device of the user, a request for one or more candidate messages from the set of candidate messages to display at the client device together with a set of messages, wherein the set of messages is associated with the user in a social network messaging service;

calculate, using a machine learning model that is based on a point-wise learning model and a pair-wise learning model, a candidate score associated with the probability that the user will select the first candidate message from the set of candidate messages, wherein:

the point-wise learning model calculates a corresponding first candidate score for each candidate message of the set of candidate messages based on a first likelihood that the user of the client device will select that candidate message, and generates a ranking of the set of candidate messages based on the corresponding first candidate score for each candidate message;

the pair-wise learning model adjusts the first candidate score of at least one candidate message of the set of candidate messages based on a second likelihood that the user will select the at least one candidate message instead of another candidate message of the set of candidate messages, and reorders the ranking of the set of candidate messages based on the adjusted first candidate score of the at least one candidate message; and the candidate score for the first candidate message is based on the reordered ranking of the set of candidate messages;

determine that the candidate score satisfies a threshold score;

send, for display at the client device, the first candidate message;

receive, from the client device, an impression callback time that indicates a time when the first candidate message was displayed at the client device;

receive, from the client device, an engagement callback time that indicates a time when the user selected the first candidate message at the client device; and train the machine learning model based at least in part on a difference between the impression callback time and the engagement callback time.

12. The non-transitory computer-readable storage medium of claim 11, wherein the instructions that cause the at least one processor to train the machine learning model comprise instructions that, when executed, cause the at least one processor to:

train the machine learning model based on training instances for single candidate messages and training instances for pairs of candidate messages.

13. The non-transitory computer-readable storage medium of claim 12, further comprising instructions that, when executed, cause the at least one processor to:

receive, from a plurality of client devices, a continuous stream of training instances that correspond to the candidate message displayed at the plurality of client devices, wherein each training instance indicates at least one of the impression callback or the engagement callback associated with the candidate message of the set of candidate messages; and wherein the instructions that cause the at least one processor to train the machine learning model comprises instructions further cause the at least one processor to train the machine learning model based at least in part on the continuous stream of training instances that correspond to the candidate message.

14. The non-transitory computer-readable storage medium of claim 11, wherein instructions that cause the at least one processor to determine the candidate score comprise instructions that, when executed, cause the at least one processor to:

determine, based at least in part on the probability that the user will select the candidate message and a bid price that an advertiser will pay if the user selects the candidate message, the candidate score for the candidate message.

15. The non-transitory computer-readable storage medium of claim 11, further comprising instructions that, when executed, cause the at least one processor to:
send the candidate message in a set of candidate messages, wherein each respective candidate message in the set of candidate messages has a respective candidate score that satisfies the threshold score.

* * * * *